(12) United States Patent
Schaffer et al.

(10) Patent No.: US 8,206,669 B2
(45) Date of Patent: Jun. 26, 2012

(54) METHOD AND APPARATUS FOR TREATING A SOUR GAS

(75) Inventors: Charles Linford Schaffer, Allentown, PA (US); Andrew David Wright, Guildford (GB); Kevin Boyle Fogash, Wescosville, PA (US); Jeffrey William Kloosterman, Allentown, PA (US); Vincent White, Ashtead (GB)

(73) Assignee: Air Products and Chemicals, Inc., Allentown, PA (US)

(*) Notice: Subject to any disclaimer, the term of this patent is extended or adjusted under 35 U.S.C. 154(b) by 36 days.

(21) Appl. No.: 12/844,034

(22) Filed: Jul. 27, 2010

(65) Prior Publication Data

US 2012/0027656 A1    Feb. 2, 2012

(51) Int. Cl.
*B01J 8/00* (2006.01)
*C01B 3/02* (2006.01)
*C01B 31/20* (2006.01)

(52) U.S. Cl. ........ 423/210; 423/220; 423/222; 423/248; 423/573.1; 423/437.1; 423/648.1; 422/168; 422/169; 422/170; 422/172

(58) Field of Classification Search .......... 423/210, 423/220, 222, 248, 573.1, 437.1, 648.1; 422/168, 422/169, 170, 172
See application file for complete search history.

(56) References Cited

U.S. PATENT DOCUMENTS

| | | | |
|---|---|---|---|
| 4,356,161 A | 10/1982 | McNamara et al. | |
| 4,826,670 A | 5/1989 | Hegarty | |
| 5,122,351 A | 6/1992 | Hardison | |
| 5,248,321 A | 9/1993 | Yang | |
| 6,818,194 B2 | 11/2004 | DeBerry et al. | |
| 7,306,651 B2 | 12/2007 | Cieutat et al. | |
| 2007/0178035 A1 | 8/2007 | White et al. | |
| 2008/0173584 A1 | 7/2008 | White et al. | |
| 2008/0173585 A1 | 7/2008 | White et al. | |
| 2010/0011955 A1 | 1/2010 | Hufton et al. | |
| 2010/0111824 A1 | 5/2010 | Schlichting et al. | |

(Continued)

FOREIGN PATENT DOCUMENTS
EP    0581026    6/1993
(Continued)

OTHER PUBLICATIONS

Zhang, et al; "Reactions between Hydrogen Sulfide and Sulfuric Acid: A Novel Process for Sulfur Removal and Recovery" Ind. Eng. Chem. Res. (2000), 39 p. 2505-2509.

(Continued)

*Primary Examiner* — Timothy Vanoy
(74) *Attorney, Agent, or Firm* — Willard Jones, II

(57) ABSTRACT

A feed gas comprising $CO_2$, $H_2S$ and $H_2$ is treated to produce an $H_2$-enriched product and a $CO_2$ product. The feed gas is separated by pressure swing adsorption to provide a stream of the $H_2$-enriched product, and two streams of sour gas depleted in $H_2$ and enriched in $H_2S$ and $CO_2$ relative to the feed gas. One of the streams of sour gas is processed in an $H_2S$ to elemental sulfur conversion system, in which $H_2S$ in the sour gas is converted to elemental sulfur order to obtain a stream of sweetened gas, from which the $CO_2$ product is formed. The other of said streams of sour gas is processed in an oxidation system, in which $H_2S$ in the sour gas is oxidized to $SO_x$($SO_2$ and $SO_3$) which is introduced into the $H_2S$ to elemental sulfur conversion system.

28 Claims, 2 Drawing Sheets

U.S. PATENT DOCUMENTS

2011/0033370 A1* 2/2011 Ayala et al. ............... 423/567.1

FOREIGN PATENT DOCUMENTS

| EP | 0444987 | 8/1993 |
| EP | 0633219 | 1/1995 |
| EP | 0798032 | 1/1997 |
| WO | 03082455 | 10/2003 |

OTHER PUBLICATIONS

Wang et al; "Kinetics of Reaction between Hydrogen Sulfide and Sulfide Dioxide in Sulfuric Acid Solutions" Ind. Eng. Chem. Res. (2002), 41; p. 4707-4713.

Wang et al; "Thermodynamics and Stoichiometry of Reactions between Hydrogen Sulfide and Concentrated Sulfuric Acic;" The Canadian Journal of Chemicals Engineering, vol. 81; Feb. 2003; p. 80-85.

Wang et al; "Mass-Transfer Characteristics for Gas-Liquid Reaction of H2S and Sulfuric Acid in a Packed Column;" Ind. Eng. Chem. Res. (2004) 43; p. 5846-5853.

Ockwig et al; "Membranes for Hydrogen Separation;" Chem Rev. (2007) 107, p. 4078-4110.

Schaffer et al; U.S. Appl. No. 12/844,000, filed Jul. 27, 2010; "Method and Apparatus for Adjustably Treating a Sour Gas".

* cited by examiner

US 8,206,669 B2

METHOD AND APPARATUS FOR TREATING A SOUR GAS

BACKGROUND OF THE INVENTION

The present invention relates to methods and apparatus for separating a feed gas, comprising carbon dioxide ($CO_2$), hydrogen sulfide ($H_2S$) and hydrogen ($H_2$), to produce an $H_2$-enriched product and a $CO_2$ product depleted in, and preferably at least substantially free of $H_2S$. In particular, it relates to methods and apparatus in which the feed is separated to form an $H_2$-enriched product gas and one or more sour (i.e. $H_2S$ containing) gases, depleted in $H_2$ and enriched in $CO_2$ and $H_2S$ relative to the feed gas, and in which said sour gas(es) are then processed in order to obtain the $CO_2$ product. The invention has particular application to the treatment of sour syngas mixtures obtained from the gasification or reformation of carbonaceous feedstock.

The production of syngas via reforming or gasifying carbonaceous feedstock is well known. Where the feedstock contains sulfur, such as is often the case for solid (e.g. coal, petcoke) or heavy liquid (e.g. asphaltene) feedstocks for gasification, such processes result in an initial syngas stream containing hydrogen ($H_2$), carbon monoxide (CO), carbon dioxide ($CO_2$), hydrogen sulfide ($H_2S$) and, usually, other species such as methane ($CH_4$), carbonyl sulfide (COS) and carbon disulfide ($CS_2$). Commonly, the initial syngas mixture (crude syngas) is then subjected to further treatments. In particular, the initial syngas mixture may be subjected to a water-gas shift reaction, in which at least some of the CO present in the initial syngas mixture is converted to further $CO_2$ and $H_2$ by reaction with $H_2O$ in the presence of a suitable shift catalyst. This process can also result in further $H_2S$ being produced, via incidental conversion of other sulfur species (such as COS and $CS_2$) in the syngas during the water-gas shift reaction.

Due to concerns over greenhouse gas emissions, there is a growing desire to remove $CO_2$ from syngas prior to use of the remaining, $H_2$-enriched, product (comprising predominantly either $H_2$ or a mixture of $H_2$ and CO) as a combustion fuel or for chemicals production or refining applications. The $CO_2$ may be compressed, so as to be stored underground or used for enhanced oil recovery (EOR). $H_2S$ may also have to be removed from the syngas. If the $H_2$-enriched product is to be used for chemicals production or refining then $H_2S$, if present, could be a poison for these downstream processes. Equally, if the $H_2$-enriched product is to be combusted in a gas turbine to generate power then $H_2S$, if present, will be converted into $SO_x$ ($SO_2$ and $SO_3$), on which there are emission limits and which may, therefore, require removal from the combustion exhaust using expensive desulfurization technology. Equally, it may not be practical or permissible to store the $H_2S$ with the $CO_2$. Therefore a solution must likewise be found for cost effective removal of $H_2S$ from the $CO_2$ before pipeline transportation or geological storage.

The most commonly used commercial solution, currently, for the problem of capturing $CO_2$ and $H_2S$ from a sour syngas mixture is to use a physical solvent (i.e. liquid solvent) absorption process, also referred to as an acid gas removal (AGR) process, such as Selexol™ or Rectisol®, to selectively separate $H_2S$, $CO_2$ and product $H_2$ into different streams. The $H_2S$-rich stream, typically containing about 20-80 mole % $H_2S$, is further treated to produce sulfur, usually by a Claus process coupled with a tail gas treating unit (TGTU). The $CO_2$ stream is typically compressed to meet pipeline or storage specifications, and the product $H_2$ is either sent as fuel to a gas turbine for power generation, or can be further processed via pressure swing adsorption (PSA) to achieve a 'spec' purity (typically 99.99 mole % or higher) for refining applications. However, a disadvantage of such AGR processes is that they are both costly and have significant power consumption.

As mentioned above, the typical method of removing the $H_2S$ contained in the $H_2S$-rich stream obtained from the AGR process is via conversion to elemental sulfur using the Claus process. This process, as is well known, typically involves an initial thermal step followed by one or more catalytic steps. In the thermal step the $H_2S$-rich stream is reacted in a substoichiometric combustion at high temperatures to convert part of the $H_2S$ to $SO_2$. The oxidant (i.e. $O_2$) to $H_2S$ ratio during combustion is controlled so that in total one third of all $H_2S$ is converted to $SO_2$. This provides the correct 2:1 molar ratio of $H_2S$ to $SO_2$ for the subsequent catalytic steps. More specifically, in said subsequent catalytic steps, the 2:1 mixture of $H_2S$ to $SO_2$ obtained from the thermal step is reacted over a suitable catalyst (e.g. activated aluminium(III) or titanium (IV) oxide) to convert the $H_2S$ and $SO_2$ to elemental sulfur via the reaction $2H_2S+SO_2 \rightarrow 3/8S_8+2H_2O$. The Claus process ordinarily achieves high (e.g. 94 to 97%) but not complete levels of sulfur recovery and thus, as noted above, a TGTU is often also employed to recover and/or remove the remaining $H_2S$ from the Claus process tailgas.

The Claus process is at its most economical when greater than 20 short tons per day (tpd) sulfur (about 18000 kg/day sulfur) is to be produced, and when the $H_2S$ concentration in the feed to the process is greater than 10 mole %, and more preferably greater than 20 mole %. For production rates of less than 20 tpd (18000 kg/day) sulfur and/or for feed streams that are more dilute in $H_2S$ concentration other, more economical, means of removing sulfur are generally preferred. Typically, these are catalyst-based processes that can be of the regenerable type or the 'once-and-done' scavenging type and require a varying degree of process complexity and operational cost depending on the processing conditions of the gas being treated. Typically, these processes are most suited for treating feeds with $H_2S$ concentrations of less than 5%, and for processes where less than 20 tpd (18000 kg/day) is to be produced (although larger units have been designed and built). These processes are typically capable of removing 99% or more of the $H_2S$ from the feed. Industry accepted examples of such $H_2S$ disposition technologies include the LO-CAT and Stretford processes.

Specific examples of known prior art processes for separating $H_2S$, and/or other sulfur containing compounds, from a mixture include the following.

US-A1-2007/0178035, the disclosure of which is incorporated herein by reference, describes a method of treating a gaseous mixture comprising $H_2$, $CO_2$ and at least one combustible gas selected from the group consisting of $H_2S$, CO and $CH_4$. The gaseous mixture, which may be obtained from the partial oxidation or reforming of a carbonaceous feedstock, is separated, preferably by pressure swing adsorption (PSA), to produce a separated $H_2$ gas and a crude $CO_2$ gas comprising the combustible gas(es). The crude $CO_2$ gas is then combusted in the presence of $O_2$ to produce heat and a $CO_2$ product gas comprising the combustion product(s) of the combustible gas(es). The heat from at least a portion of the $CO_2$ product gas is recovered by indirect heat exchange with the separated $H_2$ gas or a gas derived therefrom. Where the combustible gas is, or includes, $H_2S$, the combustion products will include $SO_2$ and $SO_3$ ($SO_x$). In one embodiment, the $SO_x$ is then removed by washing the $CO_2$ product gas with water to cool the gas and remove $SO_3$, and maintaining the cooled $SO_3$-free gas at elevated pressure in the presence of $O_2$, water and $NO_x$ to convert $SO_2$ and $NO_x$ to sulfuric acid and nitric acid, thereby obtaining an $SO_x$-free, $NO_x$-lean $CO_2$ gas.

The process described in this document therefore presents a sulfur disposition pathway in which the $H_2S$ in the sour tailgas stream leaving the PSA is ultimately converted to sulfuric acid after being combusted to form $SO_x$. This process presents a alternative to the conventional elemental sulfur disposition pathway and can, additionally, handle dilute $H_2S$ concentrations as well as varying total amounts of sulfur. However, market conditions could limit the economic viability of such a sulfur disposition pathway, as the acid produced from such a process may be unsalable or of sufficiently poor quality that costly neutralization and disposal may be required.

U.S. Pat. No. 6,818,194 B2 describes a process for removing $H_2S$ from a sour gas, wherein the sour gas is fed to an absorber where the $H_2S$ is removed from the gas by a non-aqueous sorbing liquor comprising an organic solvent for elemental sulfur, dissolved elemental sulfur, an organic base which drives the reaction between $H_2S$ sorbed by the liquor and the dissolved sulfur to form a nonvolatile polysulfide which is soluble in the sorbing liquor, and a solubilizing agent which prevents the formation of polysulfide oil. The process further comprises adding $SO_2$ to the absorber to oxidize the polysulphide to elemental sulfur, thereby producing a more complete chemical conversion of $H_2S$ by reducing the equilibrium back-pressure of $H_2S$. The sweet gas from the absorber exits the process, and the sorbent stream is then cooled and fed to a crystallizer to crystallize enough of the sulfur to balance the amount of $H_2S$ previously absorbed.

In this process, the optimum molar ratio of $H_2S$ to $SO_2$ in the feed stream to the absorber is the same as that for the catalytic stage of the Claus process, i.e. 2:1. In one embodiment, the process is applied to a feed stream which already contains a 2:1 mole ratio of $H_2S$ to $SO_2$, such as where the feed stream is the tail gas of a Claus process which is operated so as to produce a tail gas with this composition. In another embodiment, the process may be applied to an $H_2S$ containing feed stream to which $SO_2$ is first added, so as to obtain the desired 2:1 ratio prior to the stream being flowed through the absorber vessel. One exemplified way in which this may be achieved is to split the feed stream into two streams, pass one of said streams through a catalytic oxidation reactor to convert at least some of the $H_2S$ contained therein to $SO_2$, and then recombine the streams.

U.S. Pat. No. 4,356,161 describes a process for reducing the total sulfur content of a high $CO_2$-content feed gas stream, comprising $CO_2$, $H_2S$ and COS. The feed gas is first passed to an absorption column where it is contacted with an a regenerable, liquid polyalkanolamine absorbent selective for $H_2S$. The unabsorbed gas stream, comprising $CO_2$ and COS and substantially free of $H_2S$ is then routed to a reduction step where it is combined with Claus off-gases and the COS reduced to $H_2S$. The treated gas is then passed to a second absorption column and the unabsorbed gas is vented to the atmosphere. The $H_2S$-rich solvent from both absorption columns is stripped in a common stripper and the $H_2S$-rich gas is passed to a Claus unit for conversion to elemental sulfur. The absorption process described in this document is commonly referred to in the industry as an 'acid gas enrichment' process.

U.S. Pat. No. 5,122,351 describes a refinement to the known LO-CAT and Stretford processes of removing $H_2S$ by conversion to elemental sulfur, whereby the catalytic polyvalent metal redox solution used in said processes is recovered and re-used. This is achieved by interposing a closed loop evaporator/condenser process in the sulfur washing/filtering/recovery process so that wash water used to purify the sulfur and any polyvalent metal redox solution recovered from the sulfur melter are fed to an evaporator to concentrate the redox solution to a concentration capable of effective absorption of $H_2S$, and the water evaporated in the evaporator is condensed as pure water for use in washing and/or filtering the recovered sulfur.

US-A1-2010/0111824 describes a process for producing $H_2$ from a hydrocarbonaceous feed such as refinery residues, petroleum, natural gas, petroleum gas, petcoke or coal. In the exemplified embodiment, a crude syngas comprising $H_2$, CO, $CO_2$ and $H_2S$, is formed by gasifying residue oils, quenching the raw syngas, and subjecting the quenched syngas to a water-gas shift reaction. The syngas is separated via PSA into an $H_2$ product and a tail gas enriched in $CO_2$ and containing also $H_2S$, $H_2$ and CO. The PSA tail gas is mixed with a Claus process tail gas and the mixture supplied to a tail gas cleaning stage that uses a liquid solvent such as MDEA or Flexsorb SE® to selectively wash out $H_2S$ from the gas mixture. $H_2S$ is then liberated from the solvent and added to the feed stream to the Claus process.

U.S. Pat. No. 5,248,321 describes a process for removing sulfur oxides from gaseous mixtures such as flue gases from power plants, smelter gases, and other gases emitted from various industrial operations. The process involves contacting the gaseous mixture with a non-functionalized polymeric sorbent which is essentially hydrophobic, such as styrenic polymers, which sorbent may be employed in a PSA system to selectively adsorb $SO_2$. The $SO_2$ rich desorption stream may be fed to a Claus reactor along with a suitable amount of $H_2S$ to produce elemental sulfur and water.

U.S. Pat. No. 7,306,651 B2 describes the separation of a gas mixture comprising $H_2S$ and $H_2$ using the combination of a PSA unit with a membrane. The PSA separates the feed stream into an $H_2$ stream and two $H_2S$-rich streams. One $H_2S$-rich stream is recovered as a waste stream and the second is compressed and put through a membrane to remove the $H_2$. The $H_2S$ is then supplied to the PSA unit at pressure for rinsing and the $H_2$ returned to the PSA unit for purging. The gas mixture may, for example, be a stream obtained from a hydrodesulfurization process in a refinery. The $H_2S$-rich waste stream may be fed into one of the fuel/sour gas lines of the refinery.

EP-B1-0444987 describes the separation of $CO_2$ and $H_2S$ from a syngas stream produced by gasification of coal. The syngas stream, containing $H_2S$, is reacted with steam in a catalytic CO-shift reactor to convert essentially all the CO in the stream to $CO_2$. The shifted stream is sent to a PSA unit that adsorbs $CO_2$ and $H_2S$ in preference to $H_2$, to separate said stream into an $H_2$ product gas and a stream containing $CO_2$ and $H_2S$. The stream containing $CO_2$ and $H_2S$ is sent to a second PSA unit that adsorbs $H_2S$ in preference to $CO_2$, to provide a $CO_2$ product, stated to be of high purity, and a $H_2S$ containing stream, the latter being is sent to a Claus unit for conversion of the $H_2S$ into elemental sulfur.

EP-A1-0633219 describes a process for removing sulfur compounds from a gas stream containing sulfur compounds, such as the off-gas from a Claus process. The process comprises the steps of: (a) converting the sulfur compounds to sulfuric acid, by combusting sulfur compounds other than $SO_2$ to form $SO_2$, and catalytically oxidizing $SO_2$ to $SO_3$, which then forms sulfuric acid in water; (b) separating the sulfuric acid from the gas stream; and (c) supplying the sulfuric acid into the thermal stage of a Claus process to allow the sulfuric acid to react with hydrogen sulfide to form elemental sulfur.

Similarly, U.S. Pat. No. 4,826,670 describes a process for improving an oxygen-enriched Claus process by introducing a sulfuric acid stream into the reaction furnace (thermal stage of the Claus process) to moderate oxygen-induced high temperatures which allow oxygen-enrichment and attendant throughput in the Claus process to higher levels.

Industries must strike a delicate balance when selecting technologies for processing sour feeds. A successful project must minimize capital and operating cost while ensuring that the chosen technologies can appropriately and robustly meet ever tightening emissions standards. The final selection of $H_2S$ disposition technology can, as discussed above, depend on the concentration at which the $H_2S$ is present in the sour gas stream that is being treated. Where $CO_2$ is to be captured (either for underground storage or enhanced oil recovery), the presence of $H_2S$ in the $CO_2$ product presents regulatory concerns and careful design measures must be in place to ensure product purity is upheld.

It is an object of embodiments of the present invention to provide novel methods and apparatus for processing a feed gas (such as a sour syngas) comprising $CO_2$, $H_2S$ and $H_2$, to produce an $H_2$-enriched product and a $CO_2$ product depleted in, and preferably at least substantially free of, $H_2S$.

In particular, it is an object of embodiments of the present invention to provide methods and apparatus, for processing such feeds to obtain such products, that achieve economic advantages over and/or have reduced power consumption in comparison to conventional technologies (such as the standard commercial arrangement of using of a liquid solvent absorption process, i.e. an acid gas removal process such as Selexol™ or Rectisol®, to separate the feed into separate $H_2S$, $CO_2$ and $H_2$ streams, followed by treatment of the $H_2S$-rich stream in a Claus unit).

It is also an object of embodiments of the present invention to provide methods and apparatus for processing a feed gas (such as a sour syngas) comprising $CO_2$, $H_2S$ and $H_2$, to produce an $H_2$-enriched product and a $CO_2$ product depleted in $H_2S$, wherein the $H_2S$ is at least in part converted to and removed as elemental sulfur.

BRIEF SUMMARY OF THE INVENTION

According to the first aspect of the present invention, there is provided a method for treating a feed gas, comprising $CO_2$, $H_2S$ and $H_2$, to produce an $H_2$-enriched product and a $CO_2$ product, the method comprising:

separating the feed gas by pressure swing adsorption (PSA) to obtain a stream of $H_2$-enriched product gas and two streams of sour gas, each sour gas stream comprising $CO_2$, $H_2S$ and $H_2$ but being depleted in $H_2$ and enriched in $H_2S$ and $CO_2$ relative to the feed gas;

processing one of said streams of sour gas in an $H_2S$ to elemental sulfur conversion system by contacting the sour gas with $SO_2$, sulfuric acid and/or sulfurous acid to convert $H_2S$ to elemental sulfur and form a stream of sweetened gas, said sweetened gas being enriched in $CO_2$ and depleted in $H_2S$ and $H_2$ relative to the feed gas;

processing the other of said streams of sour gas in an oxidation system by oxidizing $H_2S$ and $H_2$ in the sour gas via reaction with $O_2$ to produce heat and form an oxidation effluent, said effluent comprising $CO_2$, $SO_x$ ($SO_2$ and $SO_3$) and $H_2O$ and being enriched in $CO_2$ and depleted in $H_2S$ and $H_2$ relative to the feed gas, and: (i) introducing into the $H_2S$ to elemental sulfur conversion system at least a portion of the $SO_2$ obtained from the oxidation system, so as to provide at least a portion of said $SO_2$ for reaction with $H_2S$ in the $H_2S$ to elemental sulfur conversion system; and/or (ii) converting at least a portion of the $SO_x$ obtained from the oxidation system to sulfuric and/or sulfurous acid, and introducing at least a portion of said acid into the $H_2S$ to elemental sulfur conversion system to provide at least a portion of said acid for reaction with $H_2S$ in the $H_2S$ to elemental sulfur conversion system; and forming the $CO_2$ product from said stream of sweetened gas obtained from the $H_2S$ to elemental sulfur conversion system.

According to further aspects of the present invention, there are provided apparatus suitable for carrying out the method according to the first aspect.

DETAILED DESCRIPTION OF THE INVENTION

Figure 1:
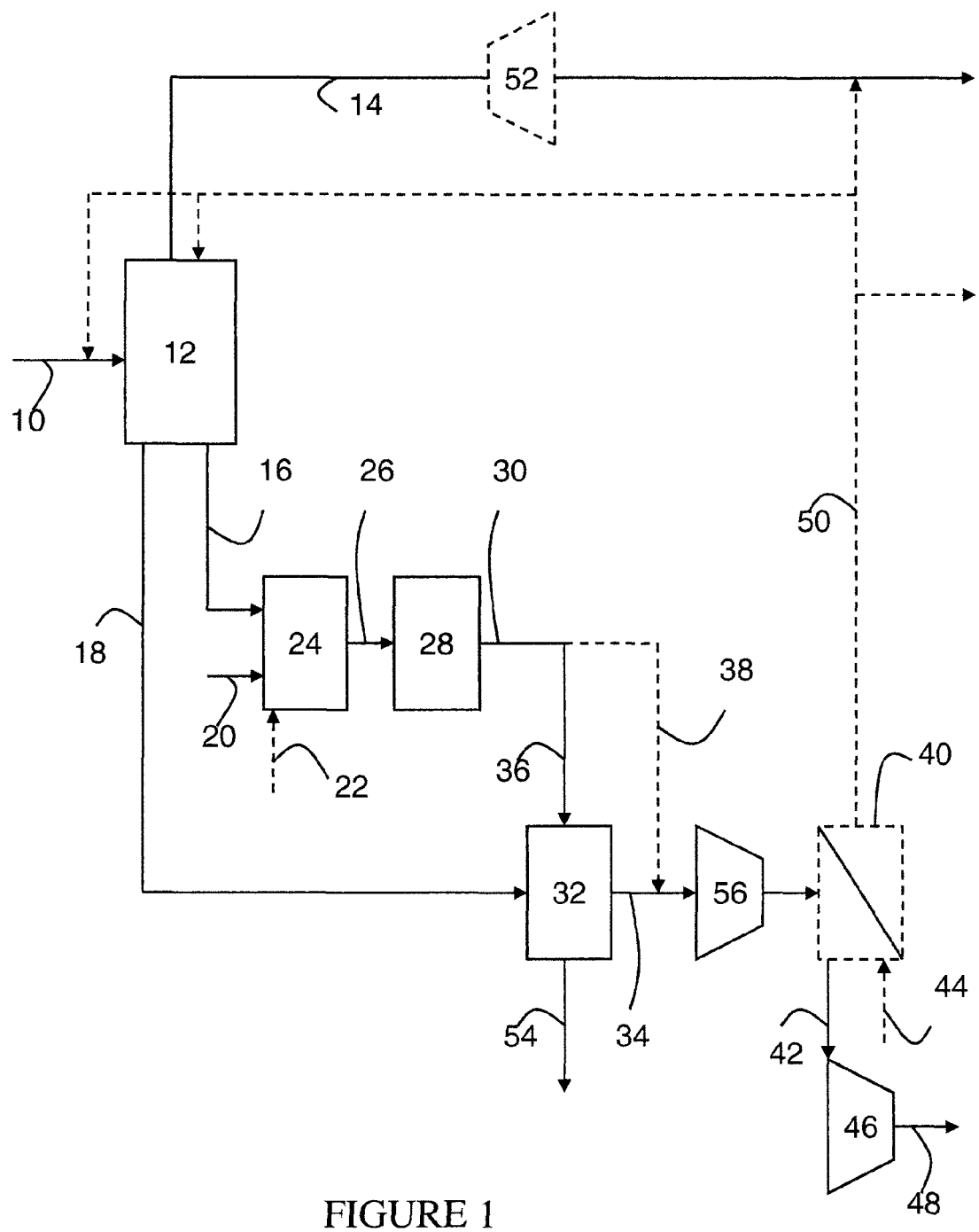
FIG. 1 is a flow sheet depicting an embodiment of the present invention.

The present invention provides a method and apparatus for treating a feed gas, comprising $CO_2$, $H_2S$ and $H_2$, to produce an $H_2$-enriched product and a $CO_2$ product. The method comprises:

separating the feed gas by pressure swing adsorption (PSA) to obtain a stream of $H_2$-enriched product gas and two streams of sour gas, each sour gas stream comprising $CO_2$, $H_2S$ and $H_2$ but being depleted in $H_2$ and enriched in $H_2S$ and $CO_2$ relative to the feed gas;

processing one of said streams of sour gas in an $H_2S$ to elemental sulfur conversion system by contacting the sour gas with $SO_2$, sulfuric acid and/or sulfurous acid to convert $H_2S$ to elemental sulfur and form a stream of sweetened gas, said sweetened gas being enriched in $CO_2$ and depleted in $H_2S$ and $H_2$ relative to the feed gas;

processing the other of said streams of sour gas in an oxidation system by oxidizing $H_2S$ and $H_2$ in the sour gas via reaction with $O_2$ to produce heat and form an oxidation effluent, said effluent comprising $CO_2$, $SO_x$ ($SO_2$ and $SO_3$) and $H_2O$ and being enriched in $CO_2$ and depleted in $H_2S$ and $H_2$ relative to the feed gas, and: (i) introducing into the $H_2S$ to elemental sulfur conversion system at least a portion of the $SO_2$ obtained from the oxidation system, so as to provide at least a portion of said $SO_2$ for reaction with $H_2S$ in the $H_2S$ to elemental sulfur conversion system; and/or (ii) converting at least a portion of the $SO_x$ obtained from the oxidation system to sulfuric and/or sulfurous acid, and introducing at least a portion of said acid into the $H_2S$ to elemental sulfur conversion system to provide at least a portion of said acid for reaction with $H_2S$ in the $H_2S$ to elemental sulfur conversion system; and forming the $CO_2$ product from said stream of sweetened gas obtained from the $H_2S$ to elemental sulfur conversion system.

This above described inventive arrangement provides a number of benefits. In particular, use of pressure swing adsorption to separate out the $H_2$-enriched product provides for both capital and operating cost savings and reduced power consumption as compared to use of liquid solvent absorption processes as used in the standard commercial arrangement.

In addition, whereas in the standard commercial arrangement the sour gas stream separated (by the liquid solvent absorption process) from the feed stream and sent for treatment in the Claus unit may be largely or entirely devoid of components other than acid gases (i.e. $H_2S$ and $CO_2$), in the method of the present invention the two sour gas streams obtained from the PSA system retain some $H_2$. Oxidation of $H_2$ in the oxidation system generates additional heat (i.e. heat additional to that generated by oxidation of $H_2S$). Thus the presence of $H_2$ in the sour gas streams can allow processing of sour gas streams that would otherwise have a concentration of $H_2S$ less than that necessary or optimal for processing of the streams (as, for example, where the oxidation system is a combustion system and absent the additional $H_2$ the concentration of $H_2S$ in the sour gas would be insufficient for stable combustion, or where absent the additional $H_2$ the concentration of $H_2S$ in the sour gas would be insufficient for generation of enough heat in the oxidation system for optimal support of conversion of $H_2S$ to sulfur in the $H_2S$ to elemental sulfur conversion system). Alternatively or additionally, the heat generated by oxidation of $H_2$ in the oxidation system, where not otherwise required by the $H_2S$ to elemental sulfur conversion system, may be put to other useful work.

Furthermore, the processing, in accordance with the present invention, of two separate sour gas streams in parallel oxidation and $H_2S$ to elemental sulfur conversion systems provides for increased operational flexibility, as compared to the standard commercial arrangement in which a single sour gas stream (separated from the feed stream by the liquid solvent absorption process) is sent to and partially combusted in an initial thermal oxidation stage of Claus unit, and all of the partially combusted effluent from said thermal oxidation stage is then passed to and processed in a catalytic stage or series of catalytic stages of the Claus unit. In particular, if the two sour gas streams are of different composition, the composition of said streams may be such that it is beneficial to fully oxidize one stream and process the other stream in the $H_2S$ to elemental sulfur conversion system, rather than mixing the two streams and sending both for partial oxidation (for example, where one of the sour gas streams contains a lower content of $H_2S$ and/or a higher content of $H_2$ and/or other components that can be oxidized to generate heat, full oxidation of this stream and treatment of the other stream in the $H_2S$ to elemental sulfur conversion system may be preferable). Equally, where not all the effluent from the oxidation system is transferred into the $H_2S$ to elemental sulfur conversion system, it is possible to oxidize more sour gas in the oxidation system than is necessary for supplying $SO_2$ or sulfuric or sulfurous acid to the conversion system, thereby allowing additional heat to be generated in and recovered from the oxidation system, without upsetting the desired ratio of $H_2S$ to $SO_2$ and/or acid in the conversion system.

The method and apparatus according to the present invention also retain the benefit of the standard commercial arrangement that at least some of the $H_2S$ is converted (directly or indirectly) to and removed in the form of elemental sulfur, thereby avoiding or at least ameliorating the problems associated with a method such as that described in US-A1-2007/0178035, in which sulfur is removed in the form of sulphuric acid (the quality of which may, as noted above, be such as to be unsalable or to require costly neutralization and disposal).

The term "sour", as used herein (and as is used in the art), refers to a gas or stream comprising $H_2S$. Likewise, the term "sweetened" or "sweet" refers to a gas or stream from which at least some of, and preferably substantially all or all of the $H_2S$ has been removed.

In the method according to the present invention, the feed gas comprises, as noted above, at least $CO_2$, $H_2S$ and $H_2$. The feed gas preferably comprises from about 10 to about 65 mole % $CO_2$, more preferably from about 10 to about 45 mole % $CO_2$. The feed gas preferably comprises up to about 5 mole %, or up to about 3 mole %, or up to about 1.5 mole % $H_2S$, and preferably comprises at least about 50 ppm $H_2S$. The feed gas preferably comprises at least about 30 mole %, more preferably at least about 50 mole % $H_2$. The feed gas is preferably a gaseous mixture obtained from gasification or reformation of a carbonaceous feedstock, and which may have been subjected to further processes such as, for example, a water-gas shift reaction (to convert some or all of the CO, present in the initially produced crude syngas, to $CO_2$ and $H_2$). Preferably, the feed gas is a sour syngas mixture (which, therefore, contains also at least some CO in addition to said $CO_2$, $H_2S$ and $H_2$). The feed gas may, for example, also contain: other carbonaceous species, such as $CH_4$; other sulfurous (i.e. sulfur containing) species, such as COS and $CS_2$; inerts, such as Ar and/or $N_2$; and/or water.

Where the feed gas contains also other sulfurous species (in addition to $H_2S$), it is preferred that these are dealt with in the method and by the apparatus of the present invention in the same manner as $H_2S$. Thus, where for example a stream is indicated herein as being enriched in, depleted in, lean in or free of $H_2S$, said stream is preferably enriched in, depleted in, lean in or free of other sulfurous species (where present) also; and where reference is made herein to $H_2S$ being adsorbed, removed, oxidized or combusted then preferably other sulfurous species (where present) are adsorbed, removed, oxidized or combusted also. In addition, where reference is made herein to maximum ppm or mole % of $H_2S$, preferably these represent also the maximum ppm or mole % of all sulfurous species (in total) in the gas or stream in question. Thus, for example, where the feed gas contains also other sulfurous species, the feed gas preferably comprises at most about 5 mole %, about 3 mole %, or about 1.5 mole % of all sulfurous species (in total).

The $H_2$-enriched product gas, obtained from separation of the feed gas by pressure swing adsorption, is enriched in $H_2$ relative to the feed gas (i.e. it has a higher mole % of $H_2$ than the feed gas). It is also depleted in $H_2S$ and $CO_2$ relative to the feed gas (i.e. it has a lower mole % of $H_2S$ and a lower mole % of $CO_2$ than the feed gas). It is preferably free or at least substantially free of $H_2S$. For example, the $H_2$-enriched product gas preferably has an $H_2S$ concentration of less than about 20 ppm, more preferably less than about 10 ppm, and most preferably less than about 5 ppm. It may also be free or at least substantially free of $CO_2$. Where the feed gas contains also CO, the $H_2$-enriched product gas may be enriched in CO or depleted in CO (or, indeed, neither) relative to the feed gas, depending on the desired end use of said product. It is generally preferred, however, that where the feed stream contains more than minor amounts of CO then the $H_2$-enriched product gas is enriched in CO as well as $H_2$. Thus, it is generally preferred that it is only where the feed gas has a CO concentration of about 5 mole % or less, more preferably of about 2 mole % or less, and most preferably of about 1 mole % or less that the $H_2$-enriched product gas is not enriched in CO relative to the feed gas.

Preferably, the $H_2$ recovery in the $H_2$-enriched product gas (i.e. the percentage of the $H_2$ present in the feed gas that is recovered in the $H_2$-enriched product) is at least about 80%, more preferably at least about 85%, more preferably at least about 90%, and most preferably at least about 95%. Where the feed stream contains CO and it is desired that the $H_2$-enriched product is enriched in CO as well as $H_2$, the combined recovery of $H_2$ and CO in the $H_2$-enriched product (i.e. the percentage of $H_2$ and CO (in combination) present in the feed gas that is recovered in the $H_2$-enriched product) is preferably at least about 75%, more preferably at least about 80%, and most preferably at least about 90%. The percentage recovery in the $H_2$-enriched product gas of a component or combination of components can be calculated from the moles of the component or components in question in the feed gas and $H_2$-enriched product gas. Thus, if for example the feed gas were to contain 25 kmol/hr of $H_2$ and 25 kmol/hr of CO, and the $H_2$-enriched product gas were to comprise 23 kmol/hr of $H_2$ and 20 kmol/hr of CO, in this case 92% of the $H_2$ would be recovered in the $H_2$-enriched product stream and 86% of the $H_2$ and CO (in combination) would be recovered in the $H_2$-enriched product stream.

Preferably, the $H_2$-enriched product gas comprises at least about 90 mole % of $H_2$ or a mixture of $H_2$ and CO, and is free or at least substantially free of $H_2S$. The $H_2$-enriched product gas may, for example, comprise about 90 mole % or more $H_2$, as may be the case where the $H_2$-enriched gas is intended for use as a fuel for combustion and expansion in, for example, a gas turbine to generate power. Alternatively, the $H_2$-enriched gas may, for example, comprise at least about 99.99 mole % $H_2$, as for example may be the case where the $H_2$-enriched gas is intended for use, without requiring further purification, for chemicals or refining applications. Alternatively still, the $H_2$-enriched gas may, for example, comprise at least about 90 mole %, and more preferably at least about 95 mole % of a mixture of $H_2$ and CO, with a $CO:H_2$ ratio as desired for the product's intended application, such as a $CO:H_2$ ratio between about 1:3 and about 3:1, and more preferably from about 1:1 to about 1:2.5 (as, for example, may be desired in Fischer-Tropsch process).

The two streams of sour gas, obtained from separation of the feed gas by pressure swing adsorption, may have the same or different compositions. The two streams may, for example be formed from a single stream of sour gas initially obtained from separation of the feed gas, which initially obtained stream is divided to provide the two streams (which streams will, in this case, therefore be of the same composition unless subjected to different processes prior to being processed in, respectively, the $H_2S$ to elemental sulfur conversion system and oxidation system). Alternatively, the two streams may be obtained as separate streams, of the same or different composition, from separation of the feed gas. Alternatively still, the two streams may be formed from different streams initially obtained from separation of the feed gas, which streams are then blended to at least some degree to form the two streams of sour gas (in which case the streams of sour gas may can again be of the same or different composition, depending on the amount of each initially obtained stream used to form each of the two streams of sour gas).

Each of the two sour gas streams comprises, as noted above, $CO_2$, $H_2S$ and at least some $H_2$. Each sour gas stream is depleted in $H_2$ and enriched in $H_2S$ and $CO_2$ relative to the feed gas (i.e. has a lower mole % of $H_2$ than the feed gas). Preferably, each sour gas stream contains at most about 30 mole % $H_2$, and typically will contain at least about 5 mole % $H_2$. Preferably, each sour gas stream comprises at most about 10 mole %, more preferably at most about 6%, more preferably at most about 3% or at most about 1% $H_2S$, and preferably each sour gas stream comprises at least about 100 ppm, more preferably at least about 0.5 mole % $H_2S$. Preferably, each sour gas stream comprises at least about 80 mole % $CO_2$. The sour gas streams may further comprise other carbonaceous species, such as CO and/or $CH_4$, and/or other sulfur containing species, such as COS and/or $CS_2$, as may have been present in the feed gas. Where CO and/or $CH_4$ are present in sour gas stream, the stream preferably comprises at most about 15 mole % of CO, $CH_4$ or the combination of the two.

The feed gas is, as noted above, separated by pressure swing adsorption (PSA) to obtain the stream of $H_2$-enriched product gas and two streams of sour gas. The PSA system in which the separation is carried out will comprise one or more types of adsorbent that selectively adsorb $CO_2$ and $H_2S$ (i.e. that adsorb $CO_2$ and $H_2S$ preferentially to $H_2$). If other sulfur containing species, such as COS and/or $CS_2$, are present in the feed gas then a PSA system is used which, preferably, comprises one or more types of adsorbent that selectively adsorb these additional sulfur containing species also. If CO and/or other carbon containing species are also present in the feed gas, then adsorbents that selectively adsorb some or all of these species may or may not be used, depending on the desired composition of the $H_2$-enriched product gas. Exemplary adsorbents include carbons, aluminas, silica gels and molecular sieves. For example, a single layer of silica gel may be used if the product requirement is a $H_2$/CO mixture, a single layer of silica gel or a silica gel/carbon split may be used if the required product is gas turbine grade $H_2$, and a silica gel/carbon/5A zeolite split may be used if the required product is high purity $H_2$. A suitable type of silica gel for use as an adsorbent is, for example, the high purity silica gel (greater than 99% $SiO_2$) described in US-A1-2010/0011955, the disclosure of which is incorporated herein by reference.

The system may comprise a plurality of adsorbent beds, as is known in the art. For example, the system may comprise a plurality of beds, with the PSA cycles of the individual beds being appropriately staggered so that at any point in time there is always at least one bed undergoing adsorption and at least one bed undergoing regeneration, such that the system can continuously separate the stream fed to it. The system may comprise beds arranged in series and/or in parallel. The PSA system may comprise a single type of adsorbent, selective for all the components that are to be selectively adsorbed by said system, or more than one type of adsorbent which adsorbents in combination provide the desired selective adsorption. Where more than one type of adsorbent is present, these may be intermixed and/or arranged in separate layers/zones of a bed, or present in separate beds arranged in series, or arranged in any other manner as appropriate and known in the art.

The PSA system may be operated in the same way as known PSA systems for separating $H_2$ from $CO_2$ (also referred to herein as $H_2$-PSA systems), with all known cycle options appropriate to this technology area (e.g. cycle and step timings; use, order and operation of adsorption, equalization, repressurisation, depressurization and purge steps; and so forth). The PSA cycle will, of course, typically include at least adsorption, blowdown/depressurisation and purge steps. During the adsorption step the feed gas is fed at superatmospheric pressure to the bed(s) undergoing the adsorption step and $CO_2$, $H_2S$ and any other species for which the adsorbent is selective are selectively adsorbed, at least a portion the gas pushed through the bed(s) during this step forming all or at least a portion of the stream of $H_2$-enriched product gas. During the blowdown/depressurization and purge steps the pressure in the bed(s) is reduced and a purge gas passed through the bed(s) to desorb $CO_2$, $H_2S$ and any other species adsorbed in the previous adsorption step, thereby regenerating the bed(s) in preparation for the next adsorption step, at least a portion of the gases obtained from the blowdown and/or purge steps forming all or at least a portion of the streams of sour gas. Although, as noted above, the adsorbent used in the PSA system is selective for $CO_2$ and $H_2S$, due to the manner in which the PSA process operates some $H_2$ will nevertheless also be present in the streams of sour gas (for example as a result of some $H_2$ also being adsorbed, being present in the void space of the bed(s), and/or being present in the gas(es) used to purge the bed(s)).

The two streams of sour gas can be formed form the gases obtained from the blowdown and/or purge steps in a variety of ways. For example, the two streams of sour gas could be formed from dividing into two streams gas from a blowdown step, or from dividing into two streams gas from a purge step. Alternatively, gas from blowdown and purge steps could be combined and withdrawn from the PSA as a single mixed stream, which stream is then divided to form the two streams of sour gas. Alternatively, one of the streams of sour gas could be formed from gas from a blowdown or purge step or from one stage of a blowdown or purge step, and the other of the streams of sour gas could formed from gas from a different blowdown or purge step or from a different stage of the same blowdown or purge step (as, for example, where one sour gas stream is formed of gas from a blowdown step and the other sour gas stream is formed of gas from a purge step; or where each of the two sour gas streams is formed of gas from a different blowdown step or of gas from a different purge step; or where one of the sour gas streams is formed of gas withdrawn during one stage of a blowdown or purge step, and the other of the streams is formed of gas withdrawn during a different stage of said step). Alternatively still, one or both of the streams of sour gas could be formed from a mixture of gas from both blowdown and purge steps, but where the proportion of gas from the blowdown and purge steps differ in the two streams of sour gas (including the situation where one stream of sour gas is formed from a mixture of gas from both blowdown and purge steps, and the other is formed of gas from a blowdown step only or from gas from a purge step only).

Suitable operating conditions for the PSA system are likewise known in the art. The adsorption step may, for example, be carried out by feeding the feed gas to the PSA system at a pressure of about 1-10 MPa (10-100 bar) absolute and at a temperature in the range of about 10-60° C., in which case the $H_2$-enriched product gas will be obtained at about the same pressure. The $H_2$-enriched product gas may, if desired, be expanded to produce power prior to said product gas being put to further use (e.g. in chemicals or refining applications).

As will be apparent from the preceding description as to how the two sour gas streams may, for example, be formed, the two sour gas streams may be obtained at the same or different pressures. The two sour gas streams will typically each be obtained at pressures about or slightly above atmospheric, i.e. about or slightly above 0.1 MPa (1 bar) absolute, but may for example also be obtained at pressures of up to about 0.5 MPa (5 bar) absolute or at sub-atmospheric pressures of down to about 0.01 MPa (0.1 bar) absolute (in this latter case the PSA system being a vacuum pressure swing adsorption system). Higher pressures for the blowdown and purge steps may also be employed if desired (although the performance of the PSA system will decrease where the base pressure of the PSA is higher, due to the dynamic capacity of the PSA system being decreased, the gas obtained from the blowdown and purge steps will be obtained at higher pressure which may be beneficial where compression of these gases for further use is required). The gas used for purging can be preheated at least in part before use. If heating is used, then a typical temperature that the purge gas is raised to is in the range of about 150° C. to about 300° C.

In a preferred embodiment, the method is carried out using a fossil fuel fired gasification system integrated with a PSA system that separates the sour syngas stream produced by the gasifier (optionally after further process steps such as a water-gas shift reaction) to obtain the stream of $H_2$-enriched product gas and two streams of sour gas.

As noted above, one of said two streams of sour gas, obtained from separation of the feed gas by PSA, is processed in an $H_2S$ to elemental sulfur conversion system by contacting the sour gas with $SO_2$, sulfuric acid and/or sulfurous acid to convert $H_2S$ to elemental sulfur (which is then removed, for example as a stream of liquid sulfur) and form a stream of sweetened gas, said sweetened gas being enriched in $CO_2$ and depleted in $H_2S$ and $H_2$ relative to the feed gas.

Said stream of sweetened gas, obtained from the $H_2S$ to elemental sulfur conversion system, is preferably free or substantially free of $H_2S$. Preferably, the $H_2S$ to elemental sulfur conversion system removes at least about 90%, more preferably at least about 97%, and most preferably at least about 99% of the $H_2S$ present in the stream of sour gas being processed in said system, such that the percentage of the $H_2S$ present in the sour gas that is recovered in the stream of sweetened gas is preferably at most about 10%, more preferably at most about 3%, more preferably at most about 1% (the percentage recovery of $H_2S$ likewise being calculable from the moles of $H_2S$ present in the sour gas stream and stream of sweetened gas). Typically, and as with the stream of sour gas from which it is formed, the stream of sweetened gas will still contain some $H_2$, as this is typically unaffected by the $H_2S$ to elemental sulfur conversion process.

The stream of sweetened gas is, as also noted above, used to form the $CO_2$ product. This may consist of simply taking the stream of sweetened gas as a $CO_2$ product. Alternatively, and as will be described in further detail below, the $CO_2$ product may be formed from the stream of sweetened gas and one or more other streams, in which case said streams may be combined and taken as the $CO_2$ product. Alternatively still, and as will also be described in further detail below, the $CO_2$ product may be formed from further processing the stream of sweetened gas, on its own or in combination with one or more other streams, to obtain a product of desired $CO_2$ purity (e.g. of higher purity than the stream of sweetened gas or sweetened gas and other stream(s) with which said sweetened gas is combined). In preferred embodiments, the $CO_2$ product may, in particular, be a high purity product, comprising for example at least about 98 mole %, more preferably at least about 99 mole %, more preferably at least about 99.9 mole % $CO_2$, suitable for geological storage or use for enhanced oil recovery (EOR). In this case, some further processing of the stream of sweetened gas (and/or any other streams to be used to form the $CO_2$ product) may be necessary.

The $H_2S$ to elemental sulfur conversion system may be a system of any type suitable for processing the stream of sour gas to obtain the desired stream of sweetened gas, and may comprise a single type of system or a combination of two or more different types of systems.

Where the $H_2S$ to elemental sulfur conversion system converts $H_2S$ to elemental sulfur via reaction with $SO_2$, the $H_2S$ to elemental sulfur system preferably comprises a catalyst that catalyses said reaction. Suitable catalysts include, for example, catalysts (e.g. activated aluminium(III) or titanium (IV) oxide) as used in the catalytic stage(s) of the standard Claus process.

The conversion of $H_2S$ to elemental sulfur via reaction with sulfuric acid may proceed according to the reaction $3H_2S+H_2SO_4 \rightarrow 4S+4H_2O$, wherein aqueous $H_2SO_4$ is reacted with gaseous $H_2S$. Similarly, the conversion of $H_2S$ to elemental sulfur via reaction with sulfurous acid may proceed according to the reaction $2H_2S+H_2SO_3 \rightarrow 3S+3H_2O$, wherein aqueous $H_2SO_3$ is reacted with gaseous $H_2S$. Further details regarding the reaction between $H_2S$ and sulfuric acid are, for example, given in: Reactions between Hydrogen Sulfide and Sulfuric Acid: A Novel Process for Sulfur Removal and Recovery, Qinglin Zhang, Ivo G. Dalla Lana, Karl T. Chuang,[†] and, Hui Wang, *Industrial & Engineering Chemistry Research* 2000 39 (7), 2505-2509; Kinetics of Reaction between Hydrogen Sulfide and Sulfur Dioxide in Sulfuric Acid Solutions, *Ind. Eng. Chem. Res.* 2002, 41, 4707-4713; Thermodynamics and Stoichiometry of Reactions between Hydrogen Sulfide and Concentration Sulfuric Acid, *The Canadian Journal of Chemical Engineering*, Volume 81, February 2003; and Mass-Transfer Characteristics for Gas-Liquid Reaction of H2S and Sulfuric Acid in a Packed Column *Ind. Eng. Chem. Res.* 2004, 43, 5846-5853; the disclosures of which are incorporated herein by reference.

If desired, said stream of sour gas to be processed in the $H_2S$ to elemental sulfur conversion system may be compressed prior to being processed in said system. This may have the advantage of allowing use of smaller vessels (and less catalyst, if a gas phase reaction is used), although it may also result in additional operating costs (associated with carrying out said compression).

Where the stream of sour gas to be processed in the $H_2S$ to elemental sulfur conversion system contains, in addition to $H_2S$, one or more other sulfur containing species, the method may further comprise treating a portion or all of said sour gas to convert one or more of said sulfur containing species to $H_2S$ prior to conversion of $H_2S$ to elemental sulfur in the $H_2S$ to elemental sulfur conversion system. This may, in particular, be preferred where a higher $H_2S$ concentration is desirable for optimal performance of the conversion system in question. Alternatively or additionally, where it is desired to increase the overall $H_2S$ concentration the said gas to be processed in the conversion system, one or more other $H_2S$ and/or sulfur species containing gas streams, as may be available on-site or be imported from off-site, could be blended with the sour gas to be processed in the conversion system.

Other sulfur species that may be present in the sour gas include, in particular (and as described above), COS and $CS_2$. A variety of processes for converting such species to $H_2S$ are known, and may suitably be employed. For example, COS may be converted to $H_2S$ and $CO_2$ in the presence of alumina and/or titania catalysts via the hydrolysis reaction $COS+H_2O \rightarrow H_2S+CO_2$. $CS_2$ may be reduced to produce $H_2S$ via the reaction $CS_2+2H_2 \rightarrow 2H_2S+C$, which is generally favored at high temperatures and can proceed over a Co—Mo—Al catalyst. The aforementioned hydrolysis reaction is also favored at high temperatures.

As noted above, the other of the two streams of sour gas, obtained from separation of the feed gas by PSA, is processed in an oxidation system by oxidizing $H_2S$ and $H_2$ in the sour gas via reaction with $O_2$ to produce heat and form an oxidation effluent, said effluent comprising $CO_2$, $SO_x(SO_2$ and $SO_3)$ and $H_2O$ and being enriched in $CO_2$ and depleted in $H_2S$ and $H_2$ relative to the feed gas. The method then further comprises the steps of: (i) introducing into the $H_2S$ to elemental sulfur conversion system at least a portion of the $SO_2$ obtained from the oxidation system, so as to provide at least a portion of said $SO_2$ for reaction with $H_2S$ in the $H_2S$ to elemental sulfur conversion system; and/or (ii) converting at least a portion of the $SO_x$ obtained from the oxidation system to sulfuric and/or sulfurous acid, and introducing at least a portion of said acid into the $H_2S$ to elemental sulfur conversion system to provide at least a portion of said acid for reaction with $H_2S$ in the $H_2S$ to elemental sulfur conversion system.

Where the two sour gas streams are of different composition, with one of said streams having (in comparison to the other of said streams) a lower concentration of $H_2S$ and/or a higher concentration of $H_2$ and/or other components (i.e. components other than $H_2S$ or $H_2$) that can be oxidized to generate heat, it is (as noted above) preferred that it is this sour gas stream (i.e. the sour gas stream with a lower concentration of $H_2S$ and/or a higher concentration of $H_2$ and/or other components that can be oxidized to generate heat) that is processed in the oxidation system.

Said oxidation effluent, obtained from the oxidation system, is preferably free or substantially free of $H_2S$. Thus, preferably all or substantially all of the $H_2S$ in the sour gas stream processed by the oxidation system is oxidized to $SO_x$ and $H_2O$. Likewise, preferably all or substantially all of the $H_2$ in the sour gas stream processed by the oxidation system is oxidized to $H_2O$ (and preferably all or substantially all of any other components in the sour gas stream that can be oxidized to generate heat are oxidized also). Preferably, the oxidation system oxidizes at least about 90%, more preferably at least about 97%, and most preferably at least about 99% of the $H_2S$ present in the stream of sour gas being processed in said system, such that the percentage of the $H_2S$ present in the sour gas that is recovered in the oxidation effluent is preferably at most about 10%, more preferably at most about 3%, more preferably at most about 1% (the percentage recovery of $H_2S$ again being calculable from the moles of $H_2S$ present in the sour gas stream and oxidation effluent). Likewise, it is preferred that the oxidation system oxidizes at least about 90%, more preferably at least about 97%, and most preferably at least about 99% of the $H_2$ (and preferably any other components that can be oxidized to generate heat) present in the stream of sour gas being processed in said system.

The oxidation system may be a system of any type suitable for processing the stream of sour gas to obtain the desired oxidation effluent, and may comprise a single type of system or a combination of two or more different types of system.

In one embodiment, the oxidation system comprises a catalytic oxidation system, the processing of the stream of sour gas in said system comprising contacting the stream with an oxidation catalyst and $O_2$ to produce heat and form said oxidation effluent. The oxidation catalyst may, for example, be in the form of a packed bed of catalyst through which the stream of sour gas and an oxidant stream (comprising the $O_2$ for reaction with $H_2S$ and $H_2$) are passed. Suitable forms of oxidation catalyst are known in the art. The use of a catalytic oxidation system may, in particular, be preferred in circumstances where the sour gas stream to be processed in said system is relatively lean in components that can be oxidized to generate heat.

In another embodiment, the oxidation system comprises a combustion system, the processing of the stream of sour gas in said system comprising combusting the stream in the presence of $O_2$ to produce heat and form said oxidation effluent. Any appropriate type of combustion system may be used, suitable burners and combustion chambers for combustion of sour gas streams being known in the art. Preferably, however, the combustion system is an oxy-fuel combustion system (i.e., a combustion system designed to be operated using an oxidant stream comprising greater than 21 mole % oxygen, and more preferably at least about 90 mole %, said oxidant stream being the stream mixed with the stream of sour gas to provide the $O_2$ for combustion).

The oxidant stream supplied to the oxidation system (whether a catalytic oxidation system, combustion system, or otherwise) and mixed with the sour gas stream to provide the $O_2$ for reaction with $H_2S$ and $H_2$ preferably comprises greater than 21 mole % oxygen. More preferably, the oxidant stream is at least about 90 mole % oxygen, and most preferably at least about 95 mole % oxygen. The oxidant stream may be oxygen enriched air, oxygen enriched recycled flue gas, or substantially pure or pure oxygen. As noted above, preferably all or at least substantially all of the $H_2S$ and $H_2$ (and any other components present in the sour gas that can be oxidized to generate heat) are oxidized to form their oxidation products ($SO_x$ and $H_2O$ in the case of $H_2S$, and $H_2O$ in the case of $H_2$). Preferably, therefore, the amount of $O_2$ provided by the oxidant stream is at least equal to, and more preferably is in excess of, the stoichiometric amount theoretically required for oxidation of all $H_2S$ and $H_2$ (and preferably all other components that can be oxidized to generate heat) that are present in the stream sour gas to be processed in the oxidation system.

The method preferably further comprises passing the oxidation effluent through a heat exchanger to recover heat therefrom via indirect heat exchange. The recovered heat may be put to various uses. For example, the recovered heat may be used to generate steam (which may, for example, be used in turn in a steam turbine to generate power), supplied to other processes, and/or exchanged with other process streams. In particular, part or all of the recovered heat may be used to supply some or all of the thermal load that may be necessary for optimal conversion of $H_2S$ in the $H_2S$ to elemental sulfur conversion system and/or for optimal prior treatment of the stream sour gas, to be fed to said conversion system, to convert additional sulfur species to $H_2S$ (where such prior treatment takes place). Where the oxidation system is a catalytic oxidation system, heat may also be extracted indirectly along the catalyst bed length (e.g. by raising steam on the outside of the packed bed or on the outside of catalyst filled tubes).

The method may also further comprise passing the stream of sweetened gas, obtained from the $H_2S$ to elemental sulfur conversion system, through a heat exchanger to recover heat therefrom via indirect heat exchange. In this case, the heat exchanger used may be the same heat exchanger as or a different heat exchanger to that used for recovering heat from the oxidation effluent, and the heat recovered from the stream of sweetened gas may, for example, be put to any of the uses described above in relation to heat recovered from the oxidation effluent.

Where the stream of sour gas to be treated in the $H_2S$ to elemental sulfur conversion system is to be contacted with $SO_2$ to convert $H_2S$ to elemental sulfur, at least a portion of the oxidation effluent may be introduced into said conversion system to provide at least a portion of said $SO_2$ for reaction with $H_2S$. Where this is the case, another portion of said oxidation effluent may, optionally, be used alongside the stream of sweetened gas from the $H_2S$ to elemental sulfur conversion system to form the $CO_2$ product.

Alternatively or additionally, where the stream of sour gas to be treated in the $H_2S$ to elemental sulfur conversion system is to be contacted with $SO_2$ to convert $H_2S$ to elemental sulfur, a portion or all of the oxidation effluent may be separated to form an $SO_2$-enriched (relative to the oxidation effluent) stream and an $SO_2$-depleted oxidation effluent, and the $SO_2$-enriched stream introduced into said conversion system to provide at least a portion of said $SO_2$ for reaction with $H_2S$. Where this is the case, a portion or all of the $SO_2$-depleted oxidation effluent may, optionally, be used alongside the stream of sweetened gas from the $H_2S$ to elemental sulfur conversion system to form the $CO_2$ product.

The $SO_2$-depleted oxidation effluent is, preferably, free or substantially free of $SO_2$. The system (also referred to herein as the "$SO_2/CO_2$ separation system") used to separate the oxidation effluent to form the $SO_2$-enriched stream and $SO_2$-depleted oxidation effluent may be of any suitable type. Exemplary systems include absorption based systems, adsorption based systems (using, for example, adsorbents such as described in U.S. Pat. No. 5,248,321, the disclosure of which is incorporated herein by reference) and distillation based systems (for example, a system as described in EP-A1-0798032, the disclosure of which is incorporated herein by reference).

Where the stream of sour gas to be treated in the $H_2S$ to elemental sulfur conversion system is to be contacted with sulfuric and/or sulfurous acid to convert $H_2S$ to elemental sulfur, $SO_x$ in a portion or all of the oxidation effluent may be converted to sulfuric and/or sulfurous acid and said acid separated from the oxidation effluent to form an $SO_x$-depleted oxidation effluent, and at least a portion of said acid may be introduced into said conversion system to provide a portion or all of said sulfuric and/or sulfurous acid for reaction with $H_2S$. Where this is the case, a portion or all of the $SO_x$-depleted oxidation effluent may, optionally, be used, alongside the stream of sweetened gas from the $H_2S$ to elemental sulfur conversion system, to form the $CO_2$ product.

The $SO_x$-depleted oxidation effluent is, preferably, free or substantially free of $SO_x$. $SO_x$ in the oxidation effluent may be converted to sulfuric acid or sulfuric and sulfurous acid by cooling the oxidation effluent to condense out water and convert $SO_3$ to sulfuric acid (typically, this will be carried out in a heat exchanger separate from any heat exchanger initially used to recover useful heat from the oxidation effluent in the manner discussed above), and maintaining the cooled oxidation effluent at elevated pressure(s), in the presence of $O_2$, water and optionally $NO_x$, for a sufficient time to convert $SO_2$ to sulfurous acid and/or $SO_2$ to sulfuric acid and $NO_x$ to nitric acid.

This process by which $SO_x$ is converted to acid may, in particular, be a process as described in US-A1-2007/0178035, preferred features of this process being, therefore, as described in this document. In particular, at least substantially all (and preferably all) of the $SO_x$ and the bulk, usually about 90%, of any $NO_x$ is preferably removed. The oxidation effluent is usually produced at a pressure of from about 0.1 MPa (1 bar) to about 0.7 MPa (7 bar), and more typically from about 0.1 MPa (1 bar) to about 0.2 MPa (2 bar), depending at least in part on the pressure at which the sour gas stream is introduced into the oxidation system, and may be compressed to the elevated pressure. The elevated pressure is usually at least about 0.3 MPa (3 bar) and preferably from about 1 MPa (10 bar) to about 5 MPa (50 bar). Contact time (or "hold-up") between the gaseous components and the liquid water after elevation of the pressure affects the degree of conversion of $SO_2$ to $H_2SO_4$ and $NO_x$ to $HNO_3$, a total "hold-up" time of no more than 60 seconds usually being sufficient for maximum conversion of $SO_2/NO_x$. Counter current gas/liquid contact devices such as columns or scrub towers allow intimate mixing of water with the gaseous components for continuous removal of $SO_2$ and $NO_x$, and thus constitute suitable devices for providing the required contact time for the conversion(s). The $O_2$ required for the conversions may be added although an amount of $O_2$ may be present in the oxidation effluent, for example where a stoichiometric excess of $O_2$ was used during oxidation. Water is present in the oxidation effluent as one of the oxidation products, but further water may be added if required. Likewise, $NO_x$ may already be present in the oxidation effluent, and/or may be added as required.

Prior to being introduced into the $H_2S$ to elemental sulfur conversion system, the stream of sulfuric and/or sulfurous acid, obtained from conversion of $SO_x$ in the oxidation effluent, may be heated to drive off excess water, thereby concentrating the acid before it is added to the conversion system. Such evaporation of water is preferably carried out at atmospheric pressure or under vacuum.

By introducing into the $H_2S$ to elemental sulfur conversion system a $SO_2$-enriched stream separated from the oxidation effluent, or sulfuric and/or sulfurous acid converted from $SO_x$ in the oxidation effluent, or only a portion of the oxidation effluent (as necessary to provide the required amount of $SO_2$ for reaction with $H_2S$), and using the $SO_2$- or $SO_x$-depleted oxidation effluent or the remainder of the oxidation effluent, alongside the stream of sweetened gas from the $H_2S$ to elemental sulfur conversion system, to form the $CO_2$ product, the amount of sour gas to be oxidized in the oxidation system relative to the amount treated in the conversion system can be increased without affecting the reaction stoichiometry in the conversion system. This, in turn, may allow additional useful heat to be generated by and recovered from the oxidation system. However, where a part of the oxidation effluent, or an $SO_2$- or $SO_x$-depleted oxidation effluent which, nevertheless, still contains some $SO_x$, is to be used also to form the $CO_2$ product, care should be taken to ensure that the amount of oxidation effluent or amount of $SO_2$- or $SO_x$-depleted oxidation effluent used is not such that the $SO_x$ content of the $CO_2$ product exceeds acceptable limits.

In certain embodiments, a third stream of sour gas may also obtained from separation of the feed gas, said third sour gas stream likewise comprising $CO_2$, $H_2S$ and $H_2$ but being depleted in $H_2$ and enriched in $H_2S$ and $CO_2$ relative to the feed gas. In this case, the method may further comprise bypassing both the $H_2S$ to elemental sulfur conversion system and the oxidation system with said third stream of the sour gas, and using said stream, alongside the stream of sweetened gas from the $H_2S$ to elemental sulfur conversion system, to form the $CO_2$ product.

In these embodiments, the third stream of sour gas is, preferably, formed from a stream of sour gas initially obtained from separation of the feed gas, which initially obtained stream is divided into the third stream and one or both of the first two streams of sour gas, and said division of sour gas between the third stream and said one or both of the other two streams is adjusted responsive to changes in the $H_2S$ content of said sour gas, such that the proportion of said sour gas bypassing the oxidation and $H_2S$ to elemental sulfur conversion systems is increased if the $H_2S$ content drops and decreased if the $H_2S$ content rises.

By bypassing the oxidation and $H_2S$ to elemental sulfur conversion systems with a stream of sour gas, so that only such part of the total sour gas obtained from the PSA system is processed in said oxidation and $H_2S$ to elemental sulfur conversion systems as is necessary to reduce to acceptable levels the $H_2S$ content of the $CO_2$ product (formed from the bypass stream, stream of sweetened gas from the $H_2S$ to elemental sulfur conversion system and, optionally, a part of the oxidation effluent or a part or all of the $SO_2$- or $SO_x$-depleted effluent), an unnecessary or "excessive" degree of $H_2S$ removal and the additional operating costs associated therewith can be avoided. In addition, by adjusting the proportion of the total sour gas treated in the oxidation and $H_2S$ to elemental sulfur conversion systems responsive to variations in the $H_2S$ content of the sour gas (i.e. by sending relatively more sour gas to the oxidation and conversion systems and less to bypass when $H_2S$ content rises, and relatively less sour gas to the oxidation and conversion systems and more to bypass when $H_2S$ content falls), the effect of any variations in the $H_2S$ content of the sour gas on the $H_2S$ content of $CO_2$ product can be dampened or cancelled. In this way, the $H_2S$ content of the sour gas(es) can still be reduced to a level necessary to meet air emissions standards and/or $CO_2$ product purity specifications during times of increased $H_2S$ content, while at the same time avoiding unnecessary or "excessive" degree of $H_2S$ removal when the $H_2S$ content of the sour gas(es) is lower.

As noted above, in order to obtain a $CO_2$ product of the desired level of purity some further processing of the stream of sweetened gas, obtained from the $H_2S$ to elemental sulfur conversion system, and of any other streams also being used to form the $CO_2$ product (such as the above described bypass stream, portion of the oxidation effluent and/or portion or all of the $SO_2$- or $SO_x$-depleted effluents) may be necessary.

In one embodiment, the method according to the invention further comprises separating the stream of sweetened gas (and any other of the aforementioned streams as may be used to form the $CO_2$ product) so as to form the $CO_2$ product and a stream comprising $H_2$. Typically, the gas comprising $H_2$ is enriched in $H_2$ relative to the feed gas, and therefore constitutes a second $H_2$-enriched gas (the $H_2$-enriched product gas being the "first" $H_2$-enriched gas). Preferably, the $CO_2$ product comprises at least about 98 mole %, more preferably at least about 99 mole %, more preferably at least about 99.9 mole % $CO_2$. Preferably, the gas comprising $H_2$ (second $H_2$-enriched gas) is at least about 60 mole %, more preferably at least about 70 mole % $H_2$. The gas comprising $H_2$ (second $H_2$-enriched gas) may be used in any other process where it would be of value. For example, depending on its composition the gas could be: blended with the $H_2$-enriched product gas (i.e. the "first" $H_2$-enriched gas) obtained via separation of the feed gas; recycled back to the PSA system used to separate the feed gas (for example, the gas comprising $H_2$ may be combined with the feed gas, separated in an additional adsorption step in the PSA cycle to provide a further portion of the $H_2$-enriched product gas, used as a rinse gas in a rinse step of the PSA cycle, or used as a repressurisation gas in a repressurisation step of the PSA cycle); and/or used in one or more additional processes. The $CO_2$ product may be compressed (or pumped) to sufficient pressure for sequestration or for use in EOR applications.

The stream of sweetened gas, and of any other streams being used to form the $CO_2$ product, may, for example, be separated by partial condensation or membrane separation so as to form the $CO_2$ product and a stream comprising $H_2$.

In the case of partial condensation, the stream(s) to be separated are cooled and separated into a condensate and a vapour, for example using one or more phase separators and/or distillation columns. The heavier components, in particular $CO_2$, are concentrated in the liquid phase, which therefore forms $CO_2$ product, the gaseous phase forming the gas comprising $H_2$ (second $H_2$-enriched gas). Partial condensation systems that would be suitable for separating the stream of sweetened gas (and any other streams as may be used to form the $CO_2$ product) are, for example, described in US-A1-2008/0173585 and US-A1-2008/0173584, the disclosures of which are incorporated herein by reference.

Where partial condensation is used, it is also important that water and other components that may freeze out (e.g. $NH_3$ and trace levels of tars) are not present in the stream(s) introduced into partial condensation system for separation, or are present only in sufficiently small amounts to avoid them freezing out and blocking the condensation system heat exchanger (which is used to cool the gas as necessary for subsequent separation into condensate and vapour) or otherwise affecting the performance of the condensation system. In order to remove water a drying system, such as a temperature swing adsorption (TSA) or absorptive (e.g. gycol, glycerol) system, may be used at any point upstream of the condensation system.

Where membrane separation is used, the stream(s) to be separated may be separated using one or more membranes having selective permeability (i.e. that are more permeable to one or more components of the stream(s) to be separated than they are to one or more other components of said stream(s)). For example, membranes may be used that are permeable to $H_2$ but largely impermeable to $CO_2$ and/or vice versa, such as are described in Journal of Membrane Science 327 (2009) 18-31, "Polymeric membranes for the hydrogen economy: Contemporary approaches and prospects for the future", the disclosure of which is incorporated herein by reference. Where, for example, a membrane is used that is permeable to $H_2$ but is, in comparison, largely impermeable to $CO_2$, during the membrane separation process the stream to be separated is introduced (typically at elevated pressure) into the membrane separation system and separated by the membrane into the second $H_2$-enriched gas (obtained at a lower pressure from the permeate side of the membrane) and the $CO_2$ product (obtained at elevated pressure from the upstream side of the membrane). A nitrogen 'sweep' stream may also be used to increase the driving force for separation, allowing the stream of $H_2$-enriched gas leaving the membrane separation system to be obtained at a higher pressure for the same membrane surface area. Membrane separation technologies are well documented in the literature and can be broadly classified as metallic, inorganics, porous carbons, organic polymers, and hybrids or composites (see, for example, Membranes for Hydrogen Separation, Nathan W. Ockwig and, Tina M. Nenoff, *Chemical Reviews* 2007 107 (10), 4078-4110, the disclosure of which is incorporated herein by reference). Polymer membranes constitute a preferred type of membrane for use in the present invention.

Alternatively, the stream of sweetened gas, obtained from the $H_2S$ to elemental sulfur conversion system, and any other streams being used to form the $CO_2$ product, may be processed to form the $CO_2$ product by oxidizing remaining $H_2$ via reaction with $O_2$. This additional oxidation step may, for example, be carried out in an additional combustion system or, more preferably, an additional catalytic oxidation system (i.e. additional to the oxidation system used to process one of the two sour gas streams obtained from the PSA system).

In this additional oxidation step, other residual components that may still be present in the stream of sweetened gas, such as for example CO and/or $CH_4$, may likewise be oxidized. Where the $CO_2$ product is to be formed from processing a portion of the oxidation effluent or portion or all of a $SO_2$- or $SO_x$-depleted oxidation effluent alongside the stream of sweetened gas, introduction of said effluent(s) into the additional oxidation system alongside the stream of sweetened gas may have the benefit of utilizing residual $O_2$ in said effluent(s), thus providing benefit even if said effluent(s) no longer contain appreciable levels of $H_2$ or other components that may be readily oxidized. Where the amount of any $O_2$ present in the stream of sweetened gas, and any other streams being processed alongside the stream of sweetened gas to form the $CO_2$ product, is insufficient to provide the stoichiometric amount of $O_2$ required for oxidation of all remaining $H_2$ and any other residual components to be oxidized then additional $O_2$ may, preferably, be added as required to provide the stoichiometric amount, such additional $O_2$ most preferably being supplied in the form of a stream of substantially pure or pure oxygen. Equally, if more than the stoichiometric amount of $O_2$ is already present in the streams being processed, and it is desired to reduce or minimise the amount of $O_2$ in the $CO_2$ product obtained, then additional $H_2$ and/or other components that can be oxidized, such as for example CO and/or $CH_4$, may be supplied to the additional oxidation system and oxidized to "use up" said surplus $O_2$. For example, in this latter instance, a portion of the stream of $H_2$-enriched product gas could also be introduced into and oxidized in the additional oxidation system.

The additional oxidation step may, for example, be carried out at about ambient pressure. Alternatively, as for example where the $CO_2$ product is to be formed form the stream of sweetened gas and an $SO_x$-depleted oxidation effluent, it may be preferable to cool and compress the stream of sweetened gas, combine this with the $SO_x$-depleted oxidation effluent, and carry out the oxidation on the combined cooled and compressed stream.

In any and all of the above embodiments, the method may further comprise processing one or more additional $H_2S$ containing streams in the oxidation and/or $H_2S$ to elemental sulfur conversion systems, alongside said streams of sour gas obtained from separation, via PSA, of the feed gas. These additional streams may be derived from processes within the plant, or may be obtained from off-site.

Apparatus of the present invention are suitable for carrying out the above described method. In one aspect, the apparatus comprises:

a pressure swing adsorption (PSA) system for separating the feed gas to obtain a stream of $H_2$-enriched product gas and two streams of sour gas, each sour gas stream comprising $CO_2$, $H_2S$ and $H_2$ but being depleted in $H_2$ and enriched in $H_2S$ and $CO_2$ relative to the feed gas;

an oxidation system for processing one of said streams of sour gas by oxidizing $H_2S$ and $H_2$ in the sour gas via reaction with $O_2$ to produce heat and form an oxidation effluent, said effluent comprising $CO_2$, $SO_x(SO_2$ and $SO_3)$ and $H_2O$ and being enriched in $CO_2$ and depleted in $H_2S$ and $H_2$ relative to the feed gas;

an $H_2S$ to elemental sulfur conversion system for processing the other of said streams of sour gas by contacting the sour gas with $SO_2$ to convert $H_2S$ to elemental sulfur and form a stream of sweetened gas, said sweetened gas being enriched in $CO_2$ and depleted in $H_2S$ and $H_2$ relative to the feed gas;

conduit means for transferring said streams of sour gas from the PSA system to the oxidation and $H_2S$ to elemental sulfur conversion systems;

a heat exchanger for recovering heat from the oxidation effluent via indirect heat exchange;

conduit means for withdrawing oxidation effluent from the oxidation system, passing the effluent through the heat exchanger, and introducing at least a portion thereof into the $H_2S$ to elemental sulfur conversion system to provide $SO_2$ for reaction with $H_2S$; and conduit means for withdrawing the stream of sweetened gas from the $H_2S$ to elemental sulfur conversion system, the $CO_2$ product being formed from said stream.

Said apparatus may, for example, further comprise:

a separation system (also referred to herein as a "$CO_2/H_2$ separation system") for receiving the stream of sweetened gas, withdrawn from the $H_2S$ to elemental sulfur conversion system, and optionally a portion of the oxidation effluent that is not introduced into the $H_2S$ to elemental sulfur conversion system, and separating said stream or streams to form the $CO_2$ product and a stream comprising $H_2$; or an additional oxidation system for receiving the stream of sweetened gas, withdrawn from the $H_2S$ to elemental sulfur conversion system, and optionally a portion of the oxidation effluent that is not introduced into the $H_2S$ to elemental sulfur conversion system, and oxidizing $H_2$ in the sweetened gas via reaction with $O_2$ so as to form the $CO_2$ product.

In another aspect, the apparatus comprises:

a pressure swing adsorption (PSA) system for separating the feed gas to obtain a stream of $H_2$-enriched product gas and two streams of sour gas, each sour gas stream comprising $CO_2$, $H_2S$ and $H_2$ but being depleted in $H_2$ and enriched in $H_2S$ and $CO_2$ relative to the feed gas;

an oxidation system for processing one of said streams of sour gas by oxidizing $H_2S$ and $H_2$ in the sour gas via reaction with $O_2$ to produce heat and form an oxidation effluent, said effluent comprising $CO_2$, $SO_x$($SO_2$ and $SO_3$) and $H_2O$ and being enriched in $CO_2$ and depleted in $H_2S$ and $H_2$ relative to the feed gas;

an $SO_2/CO_2$ separation system for separating the oxidation effluent to form an $SO_2$-enriched stream and an $SO_2$-depleted oxidation effluent;

an $H_2S$ to elemental sulfur conversion system for processing the other of said streams of sour gas by contacting the sour gas with $SO_2$ to convert $H_2S$ to elemental sulfur and form a stream of sweetened gas, said sweetened gas being enriched in $CO_2$ and depleted in $H_2S$ and $H_2$ relative to the feed gas;

conduit means for transferring said streams of sour gas from the PSA system to the oxidation and $H_2S$ to elemental sulfur conversion systems;

a heat exchanger for recovering heat from the oxidation effluent via indirect heat exchange;

conduit means for withdrawing oxidation effluent from the oxidation system, passing the effluent through the heat exchanger, and introducing the effluent into the $SO_2/CO_2$ separation system;

conduit means for transferring the $SO_2$-enriched stream from the $SO_2/CO_2$ separation system to the $H_2S$ to elemental sulfur conversion system to provide $SO_2$ for reaction with $H_2S$; and conduit means for withdrawing the stream of sweetened gas from the $H_2S$ to elemental sulfur conversion system, the $CO_2$ product being formed from said stream.

Said apparatus may, for example, further comprise:

a $CO_2/H_2$ separation system for receiving the stream of sweetened gas, withdrawn from the $H_2S$ to elemental sulfur conversion system, and optionally at least a portion of the $SO_2$-depleted oxidation effluent, and separating said stream or streams to form the $CO_2$ product and a stream comprising $H_2$; or an additional oxidation system for receiving the stream of sweetened gas, withdrawn from the $H_2S$ to elemental sulfur conversion system, and optionally at least a portion of the $SO_2$-depleted oxidation effluent, and oxidizing $H_2$ in the sweetened gas via reaction with $O_2$ so as to form the $CO_2$ product.

In a further aspect, the apparatus comprises:

a pressure swing adsorption (PSA) system for separating the feed gas to obtain a stream of $H_2$-enriched product gas and two streams of sour gas, each sour gas stream comprising $CO_2$, $H_2S$ and $H_2$ but being depleted in $H_2$ and enriched in $H_2S$ and $CO_2$ relative to the feed gas;

an oxidation system for processing one of said streams of sour gas by oxidizing $H_2S$ and $H_2$ in the sour gas via reaction with $O_2$ to produce heat and form an oxidation effluent, said effluent comprising $CO_2$, $SO_x$($SO_2$ and $SO_3$) and $H_2O$ and being enriched in $CO_2$ and depleted in $H_2S$ and $H_2$ relative to the feed gas;

a $SO_x$ to acid conversion system for converting $SO_x$ in the oxidation effluent to sulfuric and/or sulfurous acid and separating said acid from the effluent to form an $SO_x$-depleted oxidation effluent;

an $H_2S$ to elemental sulfur conversion system for processing the other of said streams of sour gas by contacting the sour gas with sulfuric and/or sulfurous acid to convert $H_2S$ to elemental sulfur and form a stream of sweetened gas, said sweetened gas being enriched in $CO_2$ and depleted in $H_2S$ and $H_2$ relative to the feed gas;

conduit means for transferring said streams of sour gas from the PSA system to the oxidation and $H_2S$ to elemental sulfur conversion systems;

a heat exchanger for recovering heat from the oxidation effluent via indirect heat exchange;

conduit means for withdrawing oxidation effluent from the oxidation system, passing the effluent through the heat exchanger, and introducing the effluent into the $SO_x$ to acid conversion system;

conduit means for transferring sulfuric and/or sulfurous acid from the $SO_x$ to acid conversion system to the $H_2S$ to elemental sulfur conversion system to provide sulfuric and/or sulfurous acid for reaction with $H_2S$; and conduit means for withdrawing the stream of sweetened gas from the $H_2S$ to elemental sulfur conversion system, the $CO_2$ product being formed from said stream.

The system for converting $SO_x$ to sulfuric and/or sulfurous acid may, for example, comprise a cooling system for cooling the oxidation effluent to condense out water and convert $SO_3$ to sulfuric acid, a compressor for elevating the pressure of the cooled oxidation effluent, and a counter current gas/liquid contact device for washing the cooled oxidation effluent with water at elevated pressure(s), in the presence of $O_2$ and optionally $NO_x$, for a sufficient time to convert $SO_2$ to sulfurous acid and/or $SO_2$ to sulfuric acid and $NO_x$ to nitric acid.

The apparatus may, for example, further comprise:

a $CO_2/H_2$ separation system for receiving the stream of sweetened gas, withdrawn from the $H_2S$ to elemental sulfur conversion system, and optionally at least a portion of the $SO_x$-depleted oxidation effluent, and separating said stream or streams to form the $CO_2$ product and a stream comprising $H_2$; or an additional oxidation system for receiving the stream of sweetened gas, withdrawn from the $H_2S$ to elemental sulfur conversion system, and optionally at least a portion of the $SO_x$-depleted oxidation effluent, and oxidizing $H_2$ in the sweetened gas via reaction with $O_2$ so as to form the $CO_2$ product.

Further preferred features and embodiments of the apparatus according to the invention will be apparent from the foregoing description of preferred features and embodiments of the method of the invention.

Aspects of the invention include:

1. A method for treating a feed gas, comprising $CO_2$, $H_2S$ and $H_2$, to produce an $H_2$-enriched product and a $CO_2$ product, the method comprising:

separating the feed gas by pressure swing adsorption (PSA) to obtain a stream of $H_2$-enriched product gas and two streams of sour gas, each sour gas stream comprising $CO_2$, $H_2S$ and $H_2$ but being depleted in $H_2$ and enriched in $H_2S$ and $CO_2$ relative to the feed gas;

processing one of said streams of sour gas in an $H_2S$ to elemental sulfur conversion system by contacting the sour gas with $SO_2$, sulfuric acid and/or sulfurous acid to convert $H_2S$ to elemental sulfur and form a stream of sweetened gas, said sweetened gas being enriched in $CO_2$ and depleted in $H_2S$ and $H_2$ relative to the feed gas;

processing the other of said streams of sour gas in an oxidation system by oxidizing $H_2S$ and $H_2$ in the sour gas via reaction with $O_2$ to produce heat and form an oxidation effluent, said effluent comprising $CO_2$, $SO_x$($SO_2$ and $SO_3$) and $H_2O$ and being enriched in $CO_2$ and depleted in $H_2S$ and $H_2$ relative to the feed gas, and: (i) introducing into the $H_2S$ to elemental sulfur conversion system at least a portion of the $SO_2$ obtained from the oxidation system, so as to provide at least a portion of said $SO_2$ for reaction with $H_2S$ in the $H_2S$ to elemental sulfur conversion system; and/or (ii) converting at least a portion of the $SO_x$ obtained from the oxidation system to sulfuric and/or sulfurous acid, and introducing at least a portion of said acid into the $H_2S$ to elemental sulfur conversion system to provide at least a portion of said acid for reaction with $H_2S$ in the $H_2S$ to elemental sulfur conversion system; and forming the $CO_2$ product from said stream of sweetened gas obtained from the $H_2S$ to elemental sulfur conversion system.

2. A method according to #1, wherein the feed gas has an $H_2S$ concentration of from about 50 ppm to about 5 mole %.

3. A method according to #1 or #2, wherein the feed gas is a sour syngas mixture, comprising $CO_2$, $H_2S$, $H_2$ and CO, obtained from gasifying or reforming carbonaceous feedstock.

4. A method according to any of #1 to #3, wherein the $H_2$-enriched product gas comprises at least about 90 mole % of $H_2$ or a mixture of $H_2$ and CO, and is free or substantially free of $H_2S$.

5. A method according to any of #1 to #4, wherein each of said sour gas streams comprises about 10 mole % or less $H_2S$.

6. A method according to any of #1 to #5, wherein the stream of sweetened gas obtained from the $H_2S$ to elemental sulfur conversion system is free or substantially free of $H_2S$.

7. A method according to any of #1 to #6, wherein the oxidation effluent obtained from the oxidation system is free or substantially free of $H_2S$.

8. A method according to any of #1 to #7, wherein the oxidation system is a combustion system, the processing of the stream of sour gas in said system comprising combusting the stream in the presence of $O_2$ to produce heat and form said oxidation effluent.

9. A method according to any of #1 to #7, wherein the oxidation system is a catalytic oxidation system, the processing of the stream of sour gas in said system comprising contacting the stream with an oxidation catalyst and $O_2$ to produce heat and form said oxidation effluent.

10. A method according to any of #1 to #9, wherein the oxidant stream supplied to the oxidation system and mixed with the sour gas stream to provide the $O_2$ for reaction with $H_2S$ and $H_2$ comprises greater than 21 mole % oxygen.

11. A method according to any of #1 to #10, wherein the method further comprises passing the oxidation effluent through a heat exchanger to recover heat therefrom via indirect heat exchange.

12. A method according to any of #1 to #11, wherein the stream of sour gas to be processed in the $H_2S$ to elemental sulfur conversion system contains, in addition to $H_2S$, one or more other sulfur containing species, and wherein the method further comprises treating a portion or all of said sour gas to convert one or more of said sulfur containing species to $H_2S$ prior to conversion of $H_2S$ to elemental sulfur in the $H_2S$ to elemental sulfur conversion system.

13. A method according to any of #1 to #12, wherein: the stream of sour gas treated in the $H_2S$ to elemental sulfur conversion system is contacted with $SO_2$ to convert $H_2S$ to elemental sulfur; at least a portion of the oxidation effluent is introduced into said conversion system to provide at least a portion of said $SO_2$ for reaction with $H_2S$; and, optionally, another portion of the oxidation effluent is used, alongside the stream of sweetened gas from the $H_2S$ to elemental sulfur conversion system, to form the $CO_2$ product.

14. A method according to any of #1 to #13, wherein: the stream of sour gas treated in the $H_2S$ to elemental sulfur conversion system is contacted with $SO_2$ to convert $H_2S$ to elemental sulfur; the oxidation effluent is separated to form an $SO_2$-enriched stream and an $SO_2$-depleted oxidation effluent, and the $SO_2$-enriched stream is introduced into said conversion system to provide at least a portion of said $SO_2$ for reaction with $H_2S$; and, optionally, at least a portion of the $SO_2$-depleted oxidation effluent is used, alongside the stream of sweetened gas from the $H_2S$ to elemental sulfur conversion system, to form the $CO_2$ product.

15. A method according to #14, wherein the $SO_2$-depleted oxidation effluent is free or substantially free of $SO_2$.

16. A method according to any of #1 to #15, wherein: the stream of sour gas treated in the $H_2S$ to elemental sulfur conversion system is contacted with sulfuric and/or sulfurous acid to convert $H_2S$ to elemental sulfur; $SO_x$ in the oxidation effluent is converted to sulfuric and/or sulfurous acid, and said acid separated from the effluent to form an $SO_x$-depleted oxidation effluent; at least a portion of said acid is introduced into said conversion system to provide at least a portion of said sulfuric and/or sulfurous acid for reaction with $H_2S$; and, optionally, at least a portion of the $SO_x$-depleted oxidation effluent is used, alongside the stream of sweetened gas from the $H_2S$ to elemental sulfur conversion system, to form the $CO_2$ product.

17. A method according to #16, wherein $SO_x$ in the oxidation effluent is converted to sulfuric acid or sulfuric and sulfurous acid by cooling the oxidation effluent to condense out water and convert $SO_3$ to sulfuric acid, and maintaining the cooled oxidation effluent at elevated pressure(s), in the presence of $O_2$, water and optionally $NO_x$, for a sufficient time to convert $SO_2$ to sulfurous acid and/or $SO_2$ to sulfuric acid and $NO_x$ to nitric acid.

18. A method according to #16 or #17, wherein the $SO_x$-depleted oxidation effluent is free or substantially free of $SO_x$.

19. A method according to any of #1 to #18, wherein a third stream of sour gas is also obtained from separation of the feed gas, said third sour gas stream likewise comprising $CO_2$, $H_2S$ and $H_2$ but being depleted in $H_2$ and enriched in $H_2S$ and $CO_2$ relative to the feed gas, and wherein the method further comprises bypassing both the $H_2S$ to elemental sulfur conversion system and the oxidation system with said third stream of the sour gas and using said stream, alongside the stream of sweetened gas from the $H_2S$ to elemental sulfur conversion system, to form the $CO_2$ product.

20. A method according to #19, wherein the third stream of sour gas is formed from a stream of sour gas initially obtained from separation of the feed gas, which initially obtained stream is divided into the third stream and one or both of the first two streams of sour gas, and wherein said division of sour gas between the third stream and said one or both of the other two streams is adjusted responsive to changes in the $H_2S$ content of said sour gas, such that the proportion of said sour gas bypassing the oxidation and $H_2S$ to elemental sulfur conversion systems is increased if the $H_2S$ content drops and decreased if the $H_2S$ content rises.

21. A method according to any of #1 to #20, wherein the method further comprises separating the stream of sweetened gas, obtained from the $H_2S$ to elemental sulfur conversion system, so as to form the $CO_2$ product and a stream comprising $H_2$.

22. A method according to #21, wherein the stream of sweetened gas is separated by partial condensation or membrane separation.

23. A method according to any of #1 to #20, wherein the method further comprises processing the stream of sweetened gas, obtained from the $H_2S$ to elemental sulfur conversion system, by oxidizing $H_2$ in the sweetened gas via reaction with $O_2$ so as to form the $CO_2$ product.

24. An apparatus for treating a feed gas, comprising $CO_2$, $H_2S$ and $H_2$, to produce an $H_2$-enriched product and a $CO_2$ product, the apparatus comprising:

a pressure swing adsorption (PSA) system for separating the feed gas to obtain a stream of ft-enriched product gas and two streams of sour gas, each sour gas stream comprising $CO_2$, $H_2S$ and $H_2$ but being depleted in $H_2$ and enriched in $H_2S$ and $CO_2$ relative to the feed gas;

an oxidation system for processing one of said streams of sour gas by oxidizing $H_2S$ and $H_2$ in the sour gas via reaction with $O_2$ to produce heat and form an oxidation effluent, said effluent comprising $CO_2$, $SO_x$ ($SO_2$ and $SO_3$) and $H_2O$ and being enriched in $CO_2$ and depleted in $H_2S$ and $H_2$ relative to the feed gas;

an $H_2S$ to elemental sulfur conversion system for processing the other of said streams of sour gas by contacting the sour gas with $SO_2$ to convert $H_2S$ to elemental sulfur and form a stream of sweetened gas, said sweetened gas being enriched in $CO_2$ and depleted in $H_2S$ and $H_2$ relative to the feed gas;

conduit means for transferring said streams of sour gas from the PSA system to the oxidation and $H_2S$ to elemental sulfur conversion systems;

a heat exchanger for recovering heat from the oxidation effluent via indirect heat exchange;

conduit means for withdrawing oxidation effluent from the oxidation system, passing the effluent through the heat exchanger, and introducing at least a portion thereof into the $H_2S$ to elemental sulfur conversion system to provide $SO_2$ for reaction with $H_2S$; and conduit means for withdrawing the stream of sweetened gas from the $H_2S$ to elemental sulfur conversion system, the $CO_2$ product being formed from said stream.

25. An apparatus according to #24, wherein the apparatus further comprises:

a $CO_2/H_2$ separation system for receiving the stream of sweetened gas, withdrawn from the $H_2S$ to elemental sulfur conversion system, and optionally a portion of the oxidation effluent that is not introduced into the $H_2S$ to elemental sulfur conversion system, and separating said stream or streams to form the $CO_2$ product and a stream comprising $H_2$; or an additional oxidation system for receiving the stream of sweetened gas, withdrawn from the $H_2S$ to elemental sulfur conversion system, and optionally a portion of the oxidation effluent that is not introduced into the $H_2S$ to elemental sulfur conversion system, and oxidizing $H_2$ in the sweetened gas via reaction with $O_2$ so as to form the $CO_2$ product.

26. An apparatus for treating a feed gas, comprising $CO_2$, $H_2S$ and $H_2$, to produce an $H_2$-enriched product and a $CO_2$ product, the apparatus comprising:

a pressure swing adsorption (PSA) system for separating the feed gas to obtain a stream of $H_2$-enriched product gas and two streams of sour gas, each sour gas stream comprising $CO_2$, $H_2S$ and $H_2$ but being depleted in $H_2$ and enriched in $H_2S$ and $CO_2$ relative to the feed gas;

an oxidation system for processing one of said streams of sour gas by oxidizing $H_2S$ and $H_2$ in the sour gas via reaction with $O_2$ to produce heat and form an oxidation effluent, said effluent comprising $CO_2$, $SO_x$ ($SO_2$ and $SO_3$) and $H_2O$ and being enriched in $CO_2$ and depleted in $H_2S$ and $H_2$ relative to the feed gas;

an $SO_2/CO_2$ separation system for separating the oxidation effluent to form an $SO_2$-enriched stream and an $SO_2$-depleted oxidation effluent;

an $H_2S$ to elemental sulfur conversion system for processing the other of said streams of sour gas by contacting the sour gas with $SO_2$ to convert $H_2S$ to elemental sulfur and form a stream of sweetened gas, said sweetened gas being enriched in $CO_2$ and depleted in $H_2S$ and $H_2$ relative to the feed gas;

conduit means for transferring said streams of sour gas from the PSA system to the oxidation and $H_2S$ to elemental sulfur conversion systems;

a heat exchanger for recovering heat from the oxidation effluent via indirect heat exchange;

conduit means for withdrawing oxidation effluent from the oxidation system, passing the effluent through the heat exchanger, and introducing the effluent into the $SO_2/CO_2$ separation system;

conduit means for transferring the $SO_2$-enriched stream from the $SO_2/CO_2$ separation system to the $H_2S$ to elemental sulfur conversion system to provide $SO_2$ for reaction with $H_2S$; and conduit means for withdrawing the stream of sweetened gas from the $H_2S$ to elemental sulfur conversion system, the $CO_2$ product being formed from said stream.

27. An apparatus according to #26, wherein the apparatus further comprises:

a $CO_2/H_2$ separation system for receiving the stream of sweetened gas, withdrawn from the $H_2S$ to elemental sulfur conversion system, and optionally at least a portion of the $SO_2$-depleted oxidation effluent, and separating said stream or streams to form the $CO_2$ product and a stream comprising $H_2$; or an additional oxidation system for receiving the stream of sweetened gas, withdrawn from the $H_2S$ to elemental sulfur conversion system, and optionally at least a portion of the $SO_2$-depleted oxidation effluent, and oxidizing $H_2$ in the sweetened gas via reaction with $O_2$ so as to form the $CO_2$ product.

28. An apparatus for treating a feed gas, comprising $CO_2$, $H_2S$ and $H_2$, to produce an $H_2$-enriched product and a $CO_2$ product, the apparatus comprising:

a pressure swing adsorption (PSA) system for separating the feed gas to obtain a stream of $H_2$-enriched product gas and two streams of sour gas, each sour gas stream comprising $CO_2$, $H_2S$ and $H_2$ but being depleted in $H_2$ and enriched in $H_2S$ and $CO_2$ relative to the feed gas;

an oxidation system for processing one of said streams of sour gas by oxidizing $H_2S$ and $H_2$ in the sour gas via reaction with $O_2$ to produce heat and form an oxidation effluent, said effluent comprising $CO_2$, $SO_x$ ($SO_2$ and $SO_3$) and $H_2O$ and being enriched in $CO_2$ and depleted in $H_2S$ and $H_2$ relative to the feed gas;

a $SO_x$ to acid conversion system for converting $SO_x$ in the oxidation effluent to sulfuric and/or sulfurous acid and separating said acid from the effluent to form an $SO_x$-depleted oxidation effluent;

an $H_2S$ to elemental sulfur conversion system for processing the other of said streams of sour gas by contacting the sour gas with sulfuric and/or sulfurous acid to convert $H_2S$ to elemental sulfur and form a stream of sweetened gas, said sweetened gas being enriched in $CO_2$ and depleted in $H_2S$ and $H_2$ relative to the feed gas;

conduit means for transferring said streams of sour gas from the PSA system to the oxidation and $H_2S$ to elemental sulfur conversion systems;

a heat exchanger for recovering heat from the oxidation effluent via indirect heat exchange;

conduit means for withdrawing oxidation effluent from the oxidation system, passing the effluent through the heat exchanger, and introducing the effluent into the $SO_x$ to acid conversion system;

conduit means for transferring sulfuric and/or sulfurous acid from the $SO_x$ to acid conversion system to the $H_2S$ to elemental sulfur conversion system to provide sulfuric and/or sulfurous acid for reaction with $H_2S$; and conduit means for withdrawing the stream of sweetened gas from the $H_2S$ to elemental sulfur conversion system, the $CO_2$ product being formed from said stream.

29. An apparatus according to #28, wherein the system for converting $SO_x$ to sulfuric and/or sulfurous acid comprises a cooling system for cooling the oxidation effluent to condense out water and convert $SO_3$ to sulfuric acid, a compressor for elevating the pressure of the cooled oxidation effluent, and a counter current gas/liquid contact device for washing the cooled oxidation effluent with water at elevated pressure(s), in the presence of $O_2$ and optionally $NO_x$, for a sufficient time to convert $SO_2$ to sulfurous acid and/or $SO_2$ to sulfuric acid and $NO_x$ to nitric acid.

30. An apparatus according to #28 or #29, wherein the apparatus further comprises:

a $CO_2/H_2$ separation system for receiving the stream of sweetened gas, withdrawn from the $H_2S$ to elemental sulfur conversion system, and optionally at least a portion of the $SO_x$-depleted oxidation effluent, and separating said stream or streams to form the $CO_2$ product and a stream comprising $H_2$; or an additional oxidation system for receiving the stream of sweetened gas, withdrawn from the $H_2S$ to elemental sulfur conversion system, and optionally at least a portion of the $SO_x$-depleted oxidation effluent, and oxidizing $H_2$ in the sweetened gas via reaction with $O_2$ so as to form the $CO_2$ product.

Solely by way of example, certain embodiments of the invention will now be described with reference to the accompanying drawings.

Referring to FIG. 1, sour syngas stream 10, comprising $H_2$, CO, $CO_2$ and $H_2S$, is fed into pressure swing adsorption (PSA) system 12, which separates the sour syngas by pressure swing adsorption into a high pressure stream, 14, of $H_2$-enriched product gas and two low pressure streams, 16 and 18, of sour gas. Each of said streams of gas comprises $H_2$, CO, $CO_2$ and $H_2S$, but is enriched in $CO_2$ and $H_2S$ and depleted in $H_2$ relative to the sour syngas. The two streams of sour gas may have the same or different compositions, and may be withdrawn (as depicted) as separate streams of sour gas from the PSA system (as, for example, where one stream is formed from gas from a blowdown step and the other from gas from a purge step), or alternatively the two streams may be withdrawn as a single stream of sour gas which is then divided into the two separate streams. The $H_2$-enriched product stream 14 may be expanded in optional expander 52 prior to, for example, being sent as fuel to a gas turbine to generate power (as, for example, where the $H_2$-enriched product comprises gas turbine fuel grade purity $H_2$) or exported for chemicals or refining applications (as, for example, where $H_2$-enriched gas comprises a high purity, e.g. 99.99 mole % or higher, $H_2$ product or a high purity syngas comprising a desired $H_2/CO$ ratio).

Stream 16 of sour gas is introduced into oxidation system 24, which may be an oxy-fuel combustion system that combusts, or a catalytic oxidation system that catalytically oxidizes all or substantially all of the $H_2$, CO and $H_2S$ present in stream 16, thereby producing a oxidation (combustion or catalytic oxidation) effluent 26 comprising $CO_2$, $SO_x$ and $H_2O$. The oxygen required for the combustion or catalytic oxidation is supplied by high purity oxygen stream 20. Optionally, where the oxidation system 24 is a combustion system it may be desired to combust also an additional fuel stream in the combustion system, as indicated by stream 22. The oxidation effluent 26 is then passed through heat exchanger 28 to recover via indirect heat exchange some of the heat therefrom.

Stream 18 of sour gas is introduced into $H_2S$ to elemental sulfur conversion system 32, which comprises a catalyst that catalyses the conversion of $H_2S$ to elemental sulfur via reaction with $SO_2$. All or substantially all of the $H_2S$ in stream 18 is reacted with $SO_2$ over the catalyst to produce elemental sulfur and $H_2O$ (via the reaction $2H_2S+SO_2 \rightarrow 3/8S_8+2H_2O$), and form a stream 34 of sweetened gas. The elemental sulfur thus formed is removed, via a sulfur handling process within conversion system 32, as stream 54 of liquid sulfur.

The $SO_2$ required for this reaction is, in the embodiment illustrated in FIG. 1, supplied by feeding at least a portion 36 of oxidation effluent 30 exiting heat exchanger 28 into conversion system 32, the flow rate of stream 36 preferably being such as to provide an amount of $SO_2$ that is sufficient for, but not significantly in excess of, the stoichiometric amount required for the reaction with $H_2S$. The heat required for optimal conversion of $H_2S$ to sulfur may be supplied by the heat recovered from the oxidation effluent in heat exchanger 28. Alternatively or additionally, the heat recovered from the oxidation effluent in heat exchanger 28 may be put to other uses, such as for example heating stream 14 of $H_2$-enriched product gas prior to said stream being expanded in optional expander 52.

Heat exchanger 28, although depicted as a single unit, could comprise one or more heat exchangers in series or parallel. The recovery of heat from stream 26 in heat exchanger 28 could, for example, be via indirect heat transfer with any or all of streams 16, 20, 22, 18 and 14, by passing said stream(s) through heat exchanger 28 also. Alternatively, a separate a heat transfer fluid (e.g. steam), could be used that is circulated through heat exchanger 26 and separate heat exchangers (not shown) associated with any or all of streams 16, 20, 22, 18 and 14 to achieve indirect heat transfer with these streams. A separate heat transfer fluid (not shown), heated by stream 26 in heat exchanger 28, could also, for example, be used to heat the catalyst beds of conversion system 32.

The stream 34 of sweetened gas obtained from conversion system 32 is used to form the desired $CO_2$ product. It may be used on its own or, as depicted in FIG. 1 by dashed line 38, a portion 38 of oxidation effluent 30 exiting heat exchanger 28, that is not introduced into conversion system 32 to supply $SO_2$ to said system, may be combined with stream 34. Where a portion 38 of oxidation effluent 30 is used in this manner it is, however, important that the relative flow rates of streams 34 and 38 are such that the amount of $SO_x$ in the resulting combined stream does not exceed acceptable levels.

Stream 34 of sweetened gas and, where taken, stream 38 of oxidation effluent, are compressed in compressor 56. Water present in stream 34 of sweetened gas and, if taken, stream 38 of oxidation effluent may be removed, for example during compression of the stream(s) in compressor 56. In the depicted embodiment, streams 34 and 38 are mixed to form a single combined stream that is compressed in compressor 56 but, equally, streams 34 and 38 could be combined within compressor 56 or could be separately compressed and combined subsequently. Depending on desired purity of the $CO_2$ product and the composition of sweetened gas stream 34 or, as the case may be, the combined stream formed from stream 34 of sweetened gas and stream 38 of oxidation effluent, the compressed stream of sweetened gas or compressed combined stream of sweetened gas and oxidation effluent from compressor 56 may be taken as the $CO_2$ product, or said stream may be subjected to further processing to obtain a $CO_2$ product of higher purity. Further processing of the stream of sweetened gas or combined stream of sweetened gas and oxidation effluent may, for example, take place in an additional oxidation system (not shown), in which the remaining $H_2$ and CO in the stream of sweetened gas is oxidized to $CO_2$ and $H_2O$, or as illustrated in FIG. 1 in a separation system ("$CO_2/H_2$ separation system") that separates the stream of sweetened gas or combined stream so as to form the $CO_2$ product and a stream comprising $H_2$.

More specifically, in the embodiment depicted in FIG. 1 the $CO_2/H_2$ separation system is a membrane separation system 40, comprising one or more membranes that are permeable to $H_2$ but are, in comparison, largely impermeable to $CO_2$, although other types of system, such as for example a partial condensation system, could equally be used. The compressed stream of sweetened gas or compressed combined stream of sweetened gas and oxidation effluent from compressor 56 is separated in the membrane separation system 40 into a stream 50 of $H_2$-enriched gas, obtained at lower pressure from the permeate side of the membrane(s), and a stream 42 of high purity $CO_2$ product gas obtained from the upstream side of the membrane(s). Optionally, an $N_2$ 'sweep' stream 44 is also used to increase the driving force for separation, allowing stream 50 of $H_2$-enriched gas leaving the membrane separation system to be obtained at a higher pressure with the same membrane surface area. Depending on its composition, stream 50 of $H_2$-enriched gas may be blended with the stream 14 of $H_2$-enriched product gas, recycled to PSA system 10 (for example by being added to sour syngas stream 10 or by being used in a rinse or repressurisation step of the PSA cycle), or used in another process. The $CO_2$ product stream 42 may be further compressed in compressor 46 prior to being piped as stream 48 for geological storage or EOR.

In an variant (not depicted) of the embodiment depicted in FIG. 1, the oxidation effluent 30 obtained from oxidation system 28 may, instead of be used directly to supply $SO_2$ to the $H_2S$ to elemental sulfur conversion system 32, be processed in a system ("$SO_2/CO_2$ separation system") that separates the oxidation effluent to form an $SO_2$-enriched (relative to the oxidation effluent) stream and an $SO_2$-depleted oxidation effluent. The $SO_2$-enriched stream from the $SO_2/CO_2$ separation system may then be introduced (in place of the stream 36 of oxidation effluent shown in FIG. 1) into the $H_2S$ to elemental sulfur conversion system, and the $SO_2$-depleted oxidation effluent exiting the $SO_2/CO_2$ separation system may, if desired, be combined (in place of the stream 38 of oxidation effluent shown in FIG. 1) with the stream of sweetened gas exiting the $H_2S$ to elemental sulfur conversion system.

Figure 2:
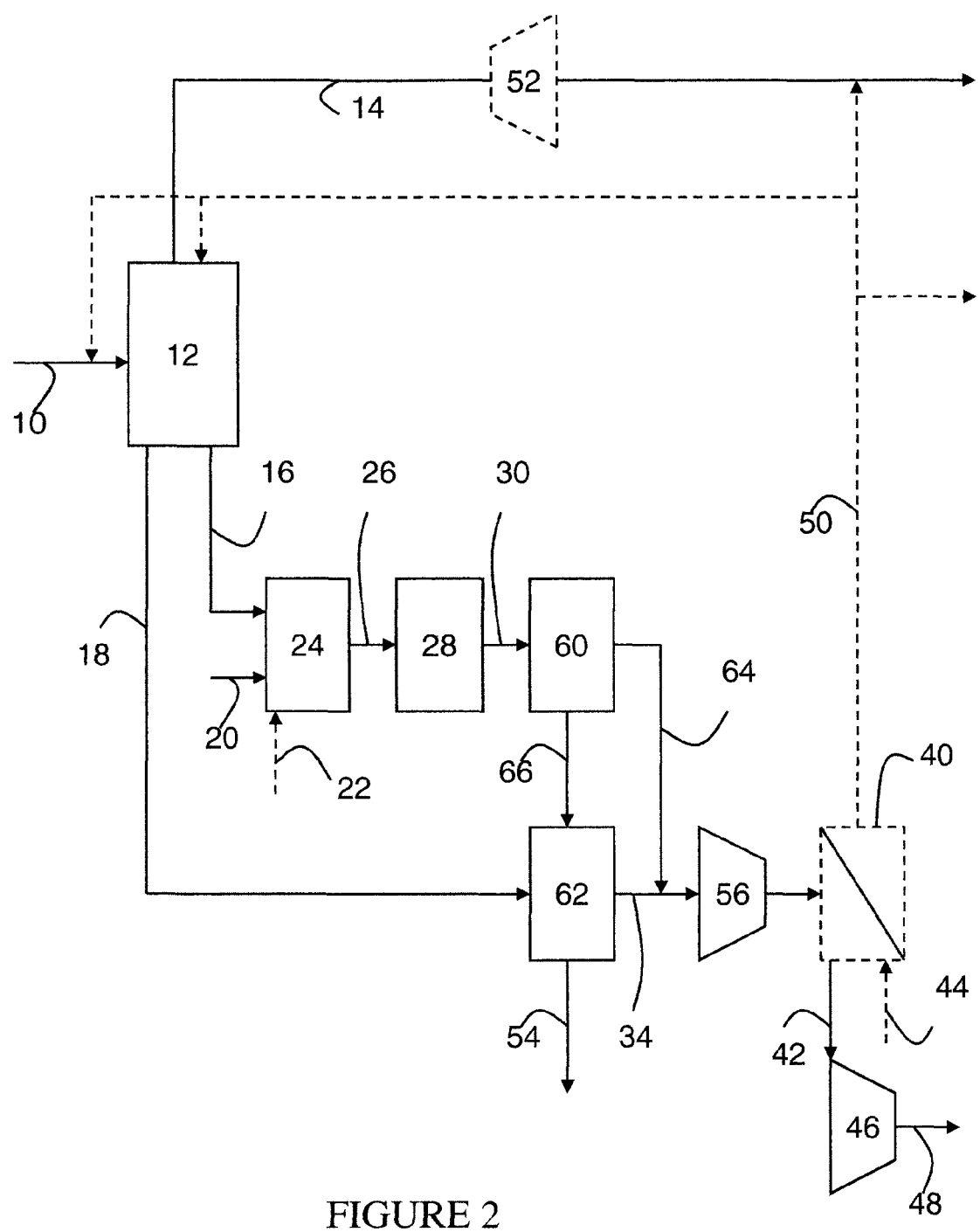
FIG. 2 is a flow sheet depicting another embodiment of the present invention.

Referring to FIG. 2, a further variant on the embodiment depicted in FIG. 1 is shown, in which the same reference numerals as used in FIG. 1 have been used to denote common features. In this embodiment, the $H_2S$ to elemental sulfur conversion system 32 of FIG. 1, in which $H_2S$ is converted to elemental sulfur via reaction with $SO_2$, is replaced with an $H_2S$ to elemental sulfur conversion system 62 in which $H_2S$ is converted to elemental sulfur via reaction with sulfuric acid ($H_2SO_4$) and/or sulfurous acid ($H_2SO_3$). Stream 16 of sour gas is, as before, fed to oxidation system 24 and all or substantially all of the $H_2$, CO and $H_2S$ in said stream is oxidized, thereby providing an oxidation effluent 26 comprising $CO_2$, $SO_x$ and $H_2O$. Stream 18 of sour gas is likewise fed to conversion system 62, which converts all or substantially all of the $H_2S$ in the stream 18 to elemental sulfur, thereby providing stream 34 of sweetened gas and stream 54 of liquid sulfur. Also, as in FIG. 1, the oxidation effluent 26 obtained from oxidation system 24 is then passed through heat exchanger 28 to recover some of the heat therefrom via indirect heat exchange, and the heat so recovered may again be supplied to the $H_2S$ to elemental sulfur conversion system as required for optimal conversion of $H_2S$ and/or put to other uses.

In the embodiment depicted in FIG. 2, however, the oxidation effluent 30 exiting heat exchanger 28 is introduced into $SO_x$ to acid conversion system 60 where it is cooled (in a further heat exchanger), compressed, and maintained at elevated pressure in the presence of $O_2$, water and, optionally $NO_x$, to convert all or substantially all of the $SO_x$ in the oxidation effluent to sulfuric acid or sulfuric and sulfurous acid, thereby forming a stream 64 of $SO_x$-depleted oxidation effluent and a stream 66 of aqueous sulfuric acid or sulfuric and sulfurous acid. At least a portion of this stream of aqueous acid (optionally, after evaporation of some of the water to obtain a more concentrated solution of acid) is introduced into the $H_2S$ to elemental sulfur conversion system 62, the amount of acid fed into the conversion system preferably being at least sufficient to provide the stoichiometric amount required for conversion of all of the $H_2S$ in sour gas stream 18 to elemental sulfur, which in the case of sulfuric acid proceeds according to the reaction $3H_2S(g)+H_2SO_4(l) \rightarrow 4S+4H_2O(l)$, and in the case of sulfurous acid proceeds according to the reaction $2H_2S(g)+H_2SO_3(l) \rightarrow 3S+3H_2O(l)$. The $SO_x$-depleted oxidation effluent 64 exiting the $SO_x$ to acid conversion separation system may then, if desired, be combined with stream 34 of sweetened gas exiting the $H_2S$ to elemental sulfur conversion system. The stream of sweetened gas or, if combined, the combined stream of sweetened gas and $SO_x$-depleted oxidation effluent may be taken as the $CO_2$ product or further processed to obtain the $CO_2$ product, as previously described in relation to FIG. 1.

It will be appreciated that the invention is not restricted to the details described above with reference to the preferred embodiments but that numerous modifications and variations can be made without departing form the spirit or scope of the invention as defined in the following claims.

The invention claimed is:

1. A method for treating a feed gas, comprising about 10 to about 65 mole % $CO_2$, about 50 ppm to about 5 mole % $H_2S$ and at least about 30 mole % $H_2$, to produce an $H_2$-enriched product and a $CO_2$ product, the method comprising:

separating the feed gas by pressure swing adsorption (PSA) to obtain a stream of $H_2$-enriched product gas and two streams of sour gas, each sour gas stream comprising $CO_2$, $H_2S$ and $H_2$ but being depleted in $H_2$ and enriched in $H_2S$ and $CO_2$ relative to the feed gas, each sour gas stream containing at least about 5 mole % $H_2$ and at most about 10 mole % $H_3S$;

processing one of said streams of sour gas in an $H_2S$ to elemental sulfur conversion system by contacting the sour gas with $SO_2$, sulfuric acid and/or sulfurous acid to convert $H_2S$ to elemental sulfur and form a stream of sweetened gas, said sweetened gas being enriched in $CO_2$ and depleted in $H_2S$ and $H_2$ relative to the feed gas;

processing the other of said streams of sour gas in an oxidation system by oxidizing at least about 90% of $H_2S$ and at least about 90% of the $H_2$ in the sour gas via reaction with $O_2$ to produce heat and form an oxidation effluent, said effluent comprising $CO_2$, $SO_x$ ($SO_2$ and $SO_3$) and $H_2O$ and being enriched in $CO_2$ and depleted in $H_2S$ and $H_2$ relative to the feed gas, and: (i) introducing into the $H_2S$ to elemental sulfur conversion system at least a portion of the $SO_2$ obtained from the oxidation system, so as to provide at least a portion of said $SO_2$ for reaction with $H_2S$ in the $H_2S$ to elemental sulfur conversion system; and/or (ii) converting at least a portion of the $SO_x$ obtained from the oxidation system to sulfuric and/or sulfurous acid, and introducing at least a portion of said acid into the $H_2S$ to elemental sulfur conversion system to provide at least a portion of said acid for reaction with $H_2S$ in the $H_2S$ to elemental sulfur conversion system; and forming the $CO_2$ product from said stream of sweetened gas obtained from the $H_2S$ to elemental sulfur conversion system.

2. The method of claim 1, wherein the feed gas is a sour syngas mixture, comprising $CO_2$, $H_2S$, $H_2$ and $CO$, obtained from gasifying or reforming carbonaceous feedstock.

3. The method of claim 1, wherein the $H_2$-enriched product gas comprises at least about 90 mole % of $H_2$ or a mixture of $H_2$ and $CO$, and is free or substantially free of $H_2S$.

4. The method of claim 1, wherein the stream of sweetened gas obtained from the $H_2S$ to elemental sulfur conversion system is free or substantially free of $H_2S$.

5. The method of claim 1, wherein the oxidation effluent obtained from the oxidation system is free or substantially free of $H_2S$.

6. The method of claim 1, wherein the oxidation system is a combustion system, the processing of the stream of sour gas in said system comprising combusting the stream in the presence of $O_2$ to produce heat and form said oxidation effluent.

7. The method of claim 1, wherein the oxidation system is a catalytic oxidation system, the processing of the stream of sour gas in said system comprising contacting the stream with an oxidation catalyst and $O_2$ to produce heat and form said oxidation effluent.

8. The method of claim 1, wherein the oxidant stream supplied to the oxidation system and mixed with the sour gas stream to provide the $O_2$ for reaction with $H_2S$ and $H_2$ comprises greater than 21 mole % oxygen.

9. The method of claim 1, wherein the method further comprises passing the oxidation effluent through a heat exchanger to recover heat therefrom via indirect heat exchange.

10. The method of claim 1, wherein the stream of sour gas to be processed in the $H_2S$ to elemental sulfur conversion system contains, in addition to $H_2S$, one or more other sulfur containing species, and wherein the method further comprises treating a portion or all of said sour gas to convert one or more of said sulfur containing species to $H_2S$ prior to conversion of $H_2S$ to elemental sulfur in the $H_2S$ to elemental sulfur conversion system.

11. The method of claim 1, wherein: the stream of sour gas treated in the $H_2S$ to elemental sulfur conversion system is contacted with $SO_2$ to convert $H_2S$ to elemental sulfur; at least a portion of the oxidation effluent is introduced into said conversion system to provide at least a portion of said $SO_2$ for reaction with $H_2S$; and, optionally, another portion of the oxidation effluent is used, alongside the stream of sweetened gas from the $H_2S$ to elemental sulfur conversion system, to form the $CO_2$ product.

12. The method of claim 1, wherein: the stream of sour gas treated in the $H_2S$ to elemental sulfur conversion system is contacted with $SO_2$ to convert $H_2S$ to elemental sulfur; the oxidation effluent is separated to form an $SO_2$-enriched stream and an $SO_2$-depleted oxidation effluent, and the $SO_2$-enriched stream is introduced into said conversion system to provide at least a portion of said $SO_2$ for reaction with $H_2S$; and, optionally, at least a portion of the $SO_2$-depleted oxidation effluent is used, alongside the stream of sweetened gas from the $H_2S$ to elemental sulfur conversion system, to form the $CO_2$ product.

13. The method of claim 12, wherein the $SO_2$-depleted oxidation effluent is free or substantially free of $SO_2$.

14. The method of claim 1, wherein: the stream of sour gas treated in the $H_2S$ to elemental sulfur conversion system is contacted with sulfuric and/or sulfurous acid to convert $H_2S$ to elemental sulfur; $SO_x$ in the oxidation effluent is converted to sulfuric and/or sulfurous acid, and said acid separated from the effluent to form an $SO_x$-depleted oxidation effluent; at least a portion of said acid is introduced into said conversion system to provide at least a portion of said sulfuric and/or sulfurous acid for reaction with $H_2S$; and, optionally, at least a portion of the $SO_x$-depleted oxidation effluent is used, alongside the stream of sweetened gas from the $H_2S$ to elemental sulfur conversion system, to form the $CO_2$ product.

15. The method of claim 14, wherein $SO_x$ in the oxidation effluent is converted to sulfuric acid or sulfuric and sulfurous acid by cooling the oxidation effluent to condense out water and convert $SO_3$ to sulfuric acid, and maintaining the cooled oxidation effluent at elevated pressure(s), in the presence of $O_2$, water and optionally $NO_x$, for a sufficient time to convert $SO_2$ to sulfurous acid and/or $SO_2$ to sulfuric acid and $NO_x$ to nitric acid.

16. The method of claim 14, wherein the $SO_x$-depleted oxidation effluent is free or substantially free of $SO_x$.

17. The method of claim 1, wherein a third stream of sour gas is also obtained from separation of the feed gas, said third sour gas stream likewise comprising $CO_2$, $H_2S$ and $H_2$ but being depleted in $H_2$ and enriched in $H_2S$ and $CO_2$ relative to the feed gas, and wherein the method further comprises bypassing both the $H_2S$ to elemental sulfur conversion system and the oxidation system with said third stream of the sour gas and using said stream, alongside the stream of sweetened gas from the $H_2S$ to elemental sulfur conversion system, to form the $CO_2$ product.

18. The method of claim 17, wherein the third stream of sour gas is formed from a stream of sour gas initially obtained from separation of the feed gas, which initially obtained stream is divided into the third stream and one or both of the first two streams of sour gas, and wherein said division of sour gas between the third stream and said one or both of the other two streams is adjusted responsive to changes in the $H_2S$ content of said sour gas, such that the proportion of said sour gas bypassing the oxidation and $H_2S$ to elemental sulfur conversion systems is increased if the $H_2S$ content drops and decreased if the $H_2S$ content rises.

19. The method of claim 1, wherein the method further comprises separating the stream of sweetened gas, obtained from the $H_2S$ to elemental sulfur conversion system, so as to form the $CO_2$ product and a stream comprising $H_2$.

20. The method of claim 19, wherein the stream of sweetened gas is separated by partial condensation or membrane separation.

21. The method of claim 1, wherein the method further comprises processing the stream of sweetened gas, obtained from the $H_2S$ to elemental sulfur conversion system, by oxidizing $H_2$ in the sweetened gas via reaction with $O_2$ so as to form the $CO_2$ product.

22. An apparatus for treating a feed gas, comprising $CO_2$, $H_2S$ and $H_2$, to produce an $H_2$-enriched product and a $CO_2$ product, the apparatus comprising:

a pressure swing adsorption (PSA) system for separating the feed gas to obtain a stream of $H_2$-enriched product gas and two streams of sour gas, each sour gas stream comprising $CO_2$, $H_2S$ and $H_2$ but being depleted in $H_2$ and enriched in $H_2S$ and $CO_2$ relative to the feed gas;

an oxidation system for processing one of said streams of sour gas by oxidizing at least about 90% of the $H_2S$ and at least about 90% of the $H_2$ in the sour gas via reaction with $O_2$ to produce heat and form an oxidation effluent, said effluent comprising $CO_2$, $SO_x$ ($SO_2$ and $SO_3$) and $H_2O$ and being enriched in $CO_2$ and depleted in $H_2S$ and $H_2$ relative to the feed gas;

an $H_2S$ to elemental sulfur conversion system for processing the other of said streams of sour gas by contacting the sour gas with $SO_2$ to convert $H_2S$ to elemental sulfur and form a stream of sweetened gas, said sweetened gas being enriched in $CO_2$ and depleted in $H_2S$ and $H_2$ relative to the feed gas;

conduit means for transferring said streams of sour gas from the PSA system to the oxidation and $H_2S$ to elemental sulfur conversion systems;

a heat exchanger for recovering heat from the oxidation effluent via indirect heat exchange;

conduit means for withdrawing oxidation effluent from the oxidation system, passing the effluent through the heat exchanger, and introducing at least a portion thereof into the $H_2S$ to elemental sulfur conversion system to provide $SO_2$ for reaction with $H_2S$; and conduit means for withdrawing the stream of sweetened gas from the $H_2S$ to elemental sulfur conversion system, the $CO_2$ product being formed from said stream.

23. An apparatus according to claim 22, wherein the apparatus further comprises:

a $CO_2/H_2$ separation system for receiving the stream of sweetened gas, withdrawn from the $H_2S$ to elemental sulfur conversion system, and optionally a portion of the oxidation effluent that is not introduced into the $H_2S$ to elemental sulfur conversion system, and separating said stream or streams to form the $CO_2$ product and a stream comprising $H_2$; or an additional oxidation system for receiving the stream of sweetened gas, withdrawn from the $H_2S$ to elemental sulfur conversion system, and optionally a portion of the oxidation effluent that is not introduced into the $H_2S$ to elemental sulfur conversion system, and oxidizing $H_2$ in the sweetened gas via reaction with $O_2$ so as to form the $CO_2$ product.

24. An apparatus for treating a feed gas, comprising $CO_2$, $H_2S$ and $H_2$, to produce an $H_2$-enriched product and a $CO_2$ product, the apparatus comprising:

a pressure swing adsorption (PSA) system for separating the feed gas to obtain a stream of $H_2$-enriched product gas and two streams of sour gas, each sour gas stream comprising $CO_2$, $H_2S$ and $H_2$ but being depleted in $H_2$ and enriched in $H_2S$ and $CO_2$ relative to the feed gas;

an oxidation system for processing one of said streams of sour gas by oxidizing at least about 90% of the $H_2S$ and at least about 90% of the $H_2$ in the sour gas via reaction with $O_2$ to produce heat and form an oxidation effluent, said effluent comprising $CO_2$, $SO_x$ ($SO_2$ and $SO_3$) and $H_2O$ and being enriched in $CO_2$ and depleted in $H_2S$ and $H_2$ relative to the feed gas;

an $SO_2/CO_2$ separation system for separating the oxidation effluent to form an $SO_2$-enriched stream and an $SO_2$-depleted oxidation effluent;

an $H_2S$ to elemental sulfur conversion system for processing the other of said streams of sour gas by contacting the sour gas with $SO_2$ to convert $H_2S$ to elemental sulfur and form a stream of sweetened gas, said sweetened gas being enriched in $CO_2$ and depleted in $H_2S$ and $H_2$ relative to the feed gas;

conduit means for transferring said streams of sour gas from the PSA system to the oxidation and $H_2S$ to elemental sulfur conversion systems;

a heat exchanger for recovering heat from the oxidation effluent via indirect heat exchange;

conduit means for withdrawing oxidation effluent from the oxidation system, passing the effluent through the heat exchanger, and introducing the effluent into the $SO_2/CO_2$ separation system;

conduit means for transferring the $SO_2$-enriched stream from the $SO_2/CO_2$ separation system to the $H_2S$ to elemental sulfur conversion system to provide $SO_2$ for reaction with $H_2S$; and conduit means for withdrawing the stream of sweetened gas from the $H_2S$ to elemental sulfur conversion system, the $CO_2$ product being formed from said stream.

25. An apparatus according to claim 4, wherein the apparatus further comprises:

a $CO_2/H_2$ separation system for receiving the stream of sweetened gas, withdrawn from the $H_2S$ to elemental sulfur conversion system, and optionally at least a portion of the $SO_2$-depleted oxidation effluent, and separating said stream or streams to form the $CO_2$ product and a stream comprising $H_2$; or an additional oxidation system for receiving the stream of sweetened gas, withdrawn from the $H_2S$ to elemental sulfur conversion system, and optionally at least a portion of the $SO_2$-depleted oxidation effluent, and oxidizing $H_2$ in the sweetened gas via reaction with $O_2$ so as to form the $CO_2$ product.

26. An apparatus for treating a feed gas, comprising $CO_2$, $H_2S$ and $H_2$, to produce an $H_2$-enriched product and a $CO_2$ product, the apparatus comprising:

a pressure swing adsorption (PSA) system for separating the feed gas to obtain a stream of $H_2$-enriched product gas and two streams of sour gas, each sour gas stream comprising $CO_2$, $H_2S$ and $H_2$ but being depleted in $H_2$ and enriched in $H_2S$ and $CO_2$ relative to the feed gas;

an oxidation system for processing one of said streams of sour gas by oxidizing at least about 90% of the $H_2S$ and at least about 90% of the $H_2$ in the sour gas via reaction with $O_2$ to produce heat and form an oxidation effluent, said effluent comprising $CO_2$, $SO_x$ ($SO_2$ and $SO_3$) and $H_2O$ and being enriched in $CO_2$ and depleted in $H_2S$ and $H_2$ relative to the feed gas;

a $SO_x$ to acid conversion system for converting $SO_x$ in the oxidation effluent to sulfuric and/or sulfurous acid and separating said acid from the effluent to form an $SO_x$-depleted oxidation effluent;

an $H_2S$ to elemental sulfur conversion system for processing the other of said streams of sour gas by contacting the sour gas with sulfuric and/or sulfurous acid to convert $H_2S$ to elemental sulfur and form a stream of sweetened gas, said sweetened gas being enriched in $CO_2$ and depleted in $H_2S$ and $H_2$ relative to the feed gas;

conduit means for transferring said streams of sour gas from the PSA system to the oxidation and $H_2S$ to elemental sulfur conversion systems;

a heat exchanger for recovering heat from the oxidation effluent via indirect heat exchange;

conduit means for withdrawing oxidation effluent from the oxidation system, passing the effluent through the heat exchanger, and introducing the effluent into the $SO_x$ to acid conversion system;

conduit means for transferring sulfuric and/or sulfurous acid from the $SO_x$ to acid conversion system to the $H_2S$ to elemental sulfur conversion system to provide sulfuric and/or sulfurous acid for reaction with $H_2S$; and conduit means for withdrawing the stream of sweetened gas from the $H_2S$ to elemental sulfur conversion system, the $CO_2$ product being formed from said stream.

27. An apparatus according to claim 26, wherein the system for converting $SO_x$ to sulfuric and/or sulfurous acid comprises a cooling system for cooling the oxidation effluent to condense out water and convert $SO_3$ to sulfuric acid, a compressor for elevating the pressure of the cooled oxidation effluent, and a counter current gas/liquid contact device for washing the cooled oxidation effluent with water at elevated pressure(s), in the presence of $O_2$ and optionally $NO_x$, for a sufficient time to convert $SO_2$ to sulfurous acid and/or $SO_2$ to sulfuric acid and $NO_x$ to nitric acid.

28. An apparatus according to claim 26, wherein the apparatus further comprises:

a $CO_2/H_2$ separation system for receiving the stream of sweetened gas, withdrawn from the $H_2S$ to elemental sulfur conversion system, and optionally at least a portion of the $SO_x$-depleted oxidation effluent, and separating said stream or streams to form the $CO_2$ product and a stream comprising $H_2$; or an additional oxidation system for receiving the stream of sweetened gas, withdrawn from the $H_2S$ to elemental sulfur conversion system, and optionally at least a portion of the $SO_x$-depleted oxidation effluent, and oxidizing $H_2$ in the sweetened gas via reaction with $O_2$ so as to form the $CO_2$ product.

* * * * *

UNITED STATES PATENT AND TRADEMARK OFFICE
CERTIFICATE OF CORRECTION

| | | |
|---|---|---|
| PATENT NO. | : 8,206,669 B2 | Page 1 of 1 |
| APPLICATION NO. | : 12/844034 | |
| DATED | : June 26, 2012 | |
| INVENTOR(S) | : Charles Linford Schaffer et al. | |

It is certified that error appears in the above-identified patent and that said Letters Patent is hereby corrected as shown below:

Column 34, Line 20

In claim 25, delete "4" and insert -- 24 --

Signed and Sealed this

Thirteenth Day of November, 2012

David J. Kappos
*Director of the United States Patent and Trademark Office*